Nov. 13, 1951  B. W. RUTHERFORD  2,574,761
PEELING MACHINE
Filed May 20, 1949  17 Sheets-Sheet 1

INVENTOR.
BENSON W. RUTHERFORD
BY
George B White
ATTORNEY

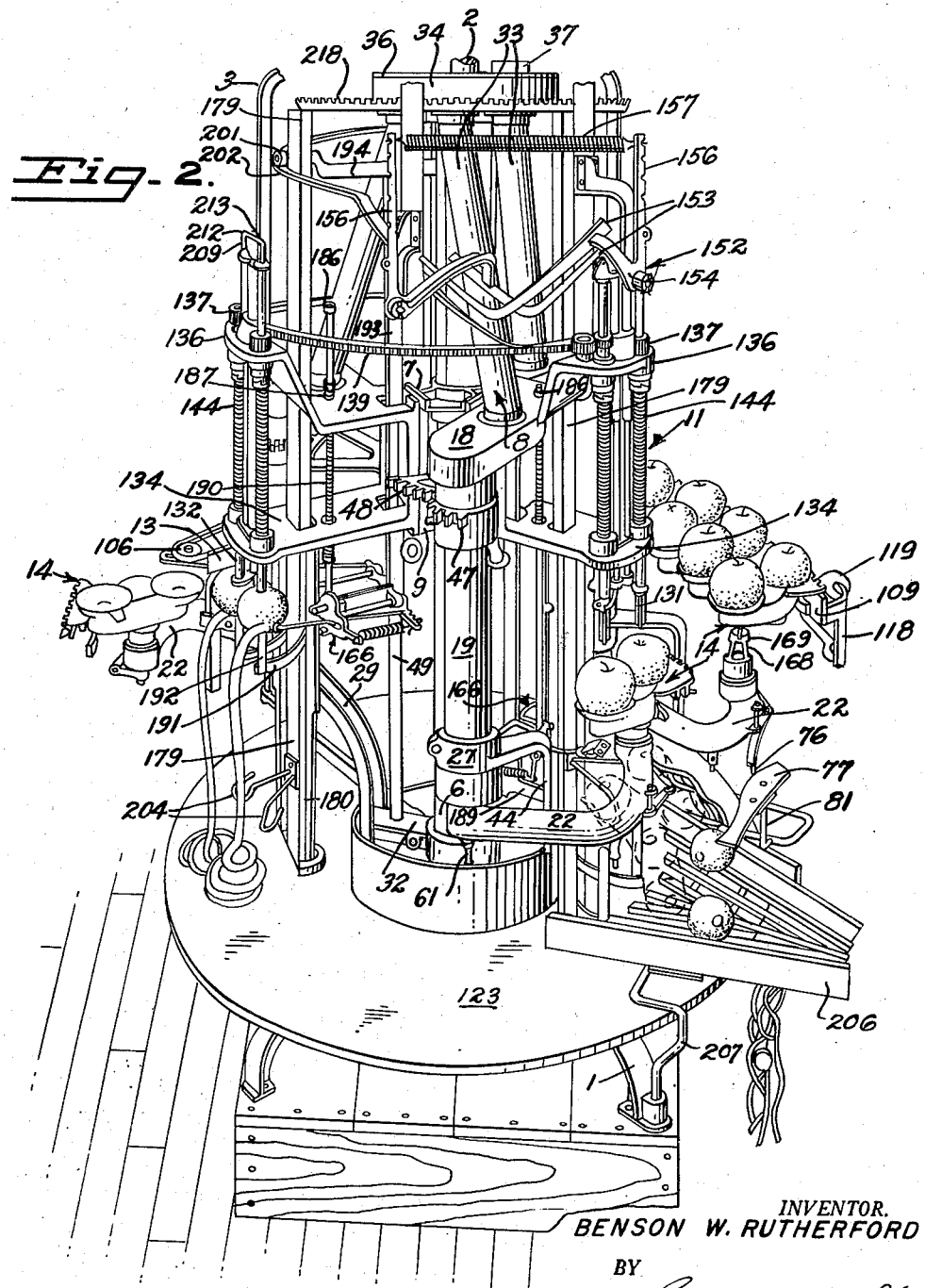

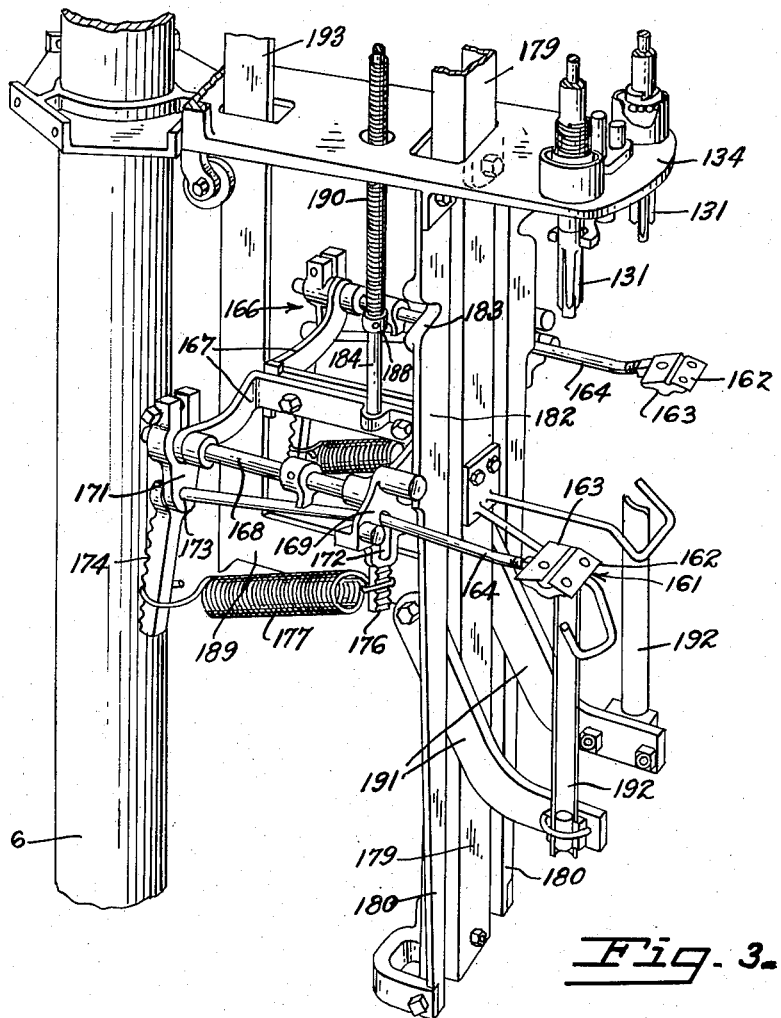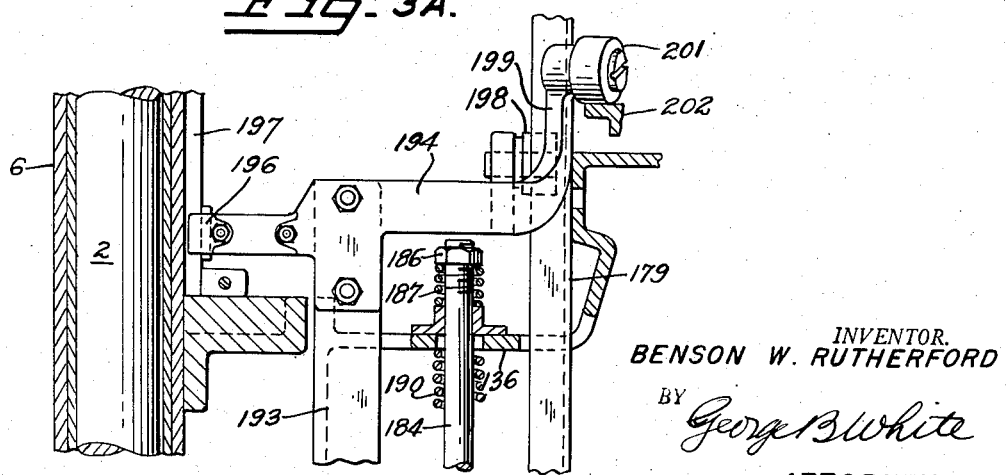

Nov. 13, 1951  B. W. RUTHERFORD  2,574,761
PEELING MACHINE
Filed May 20, 1949  17 Sheets-Sheet 4
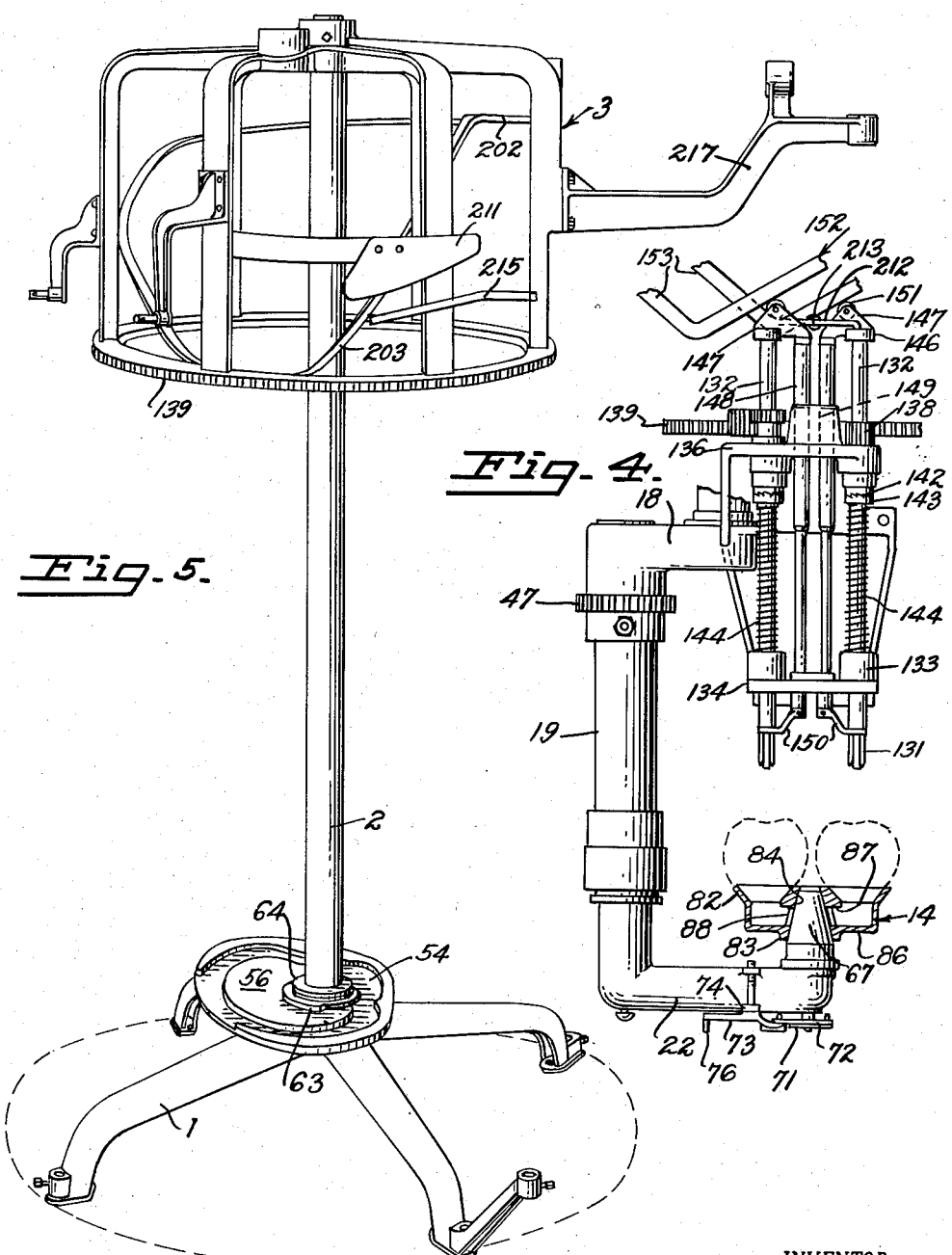
INVENTOR.
BENSON W. RUTHERFORD
BY George B White
ATTORNEY Nov. 13, 1951     B. W. RUTHERFORD     2,574,761
PEELING MACHINE
Filed May 20, 1949     17 Sheets-Sheet 5
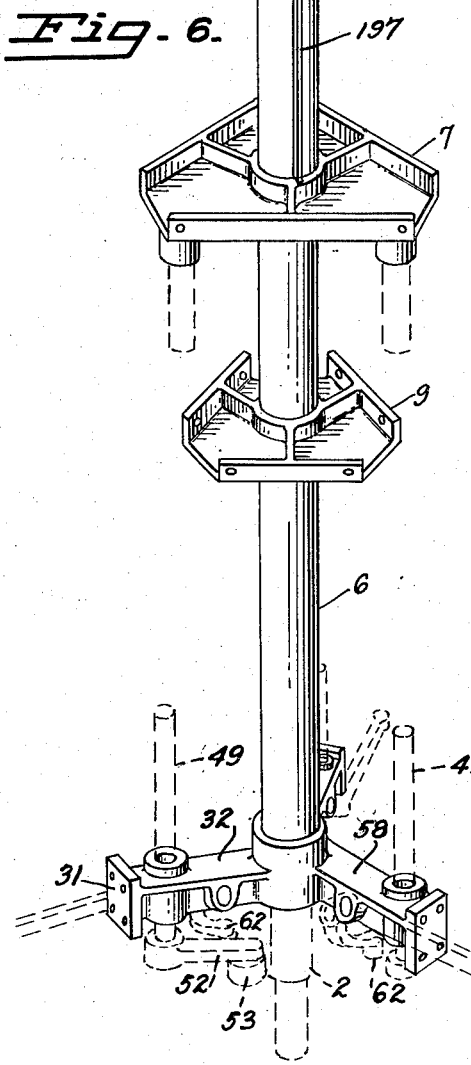
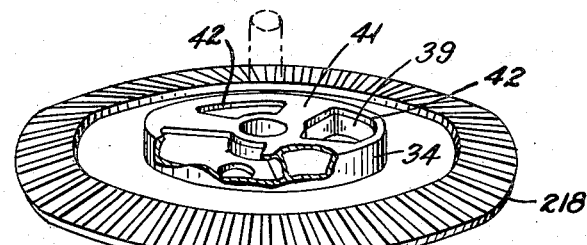
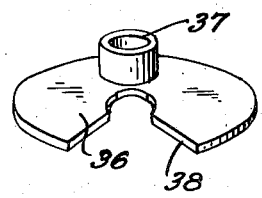
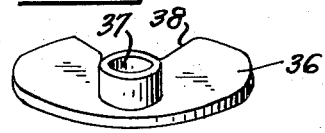
INVENTOR.
BENSON W. RUTHERFORD
BY
ATTORNEY

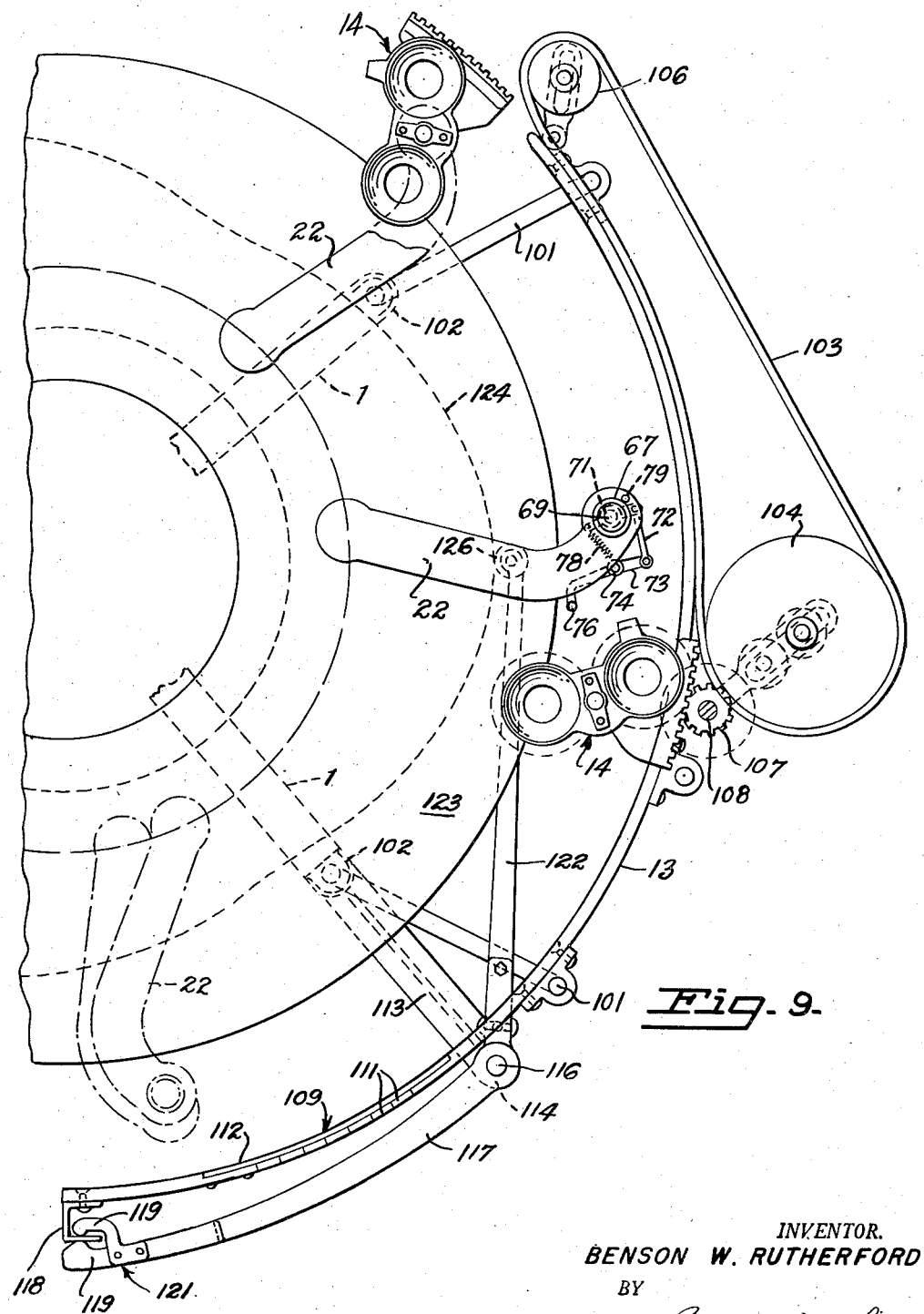

Nov. 13, 1951  B. W. RUTHERFORD  2,574,761
PEELING MACHINE
Filed May 20, 1949  17 Sheets-Sheet 12

INVENTOR.
BENSON W. RUTHERFORD
BY
George B White
ATTORNEY

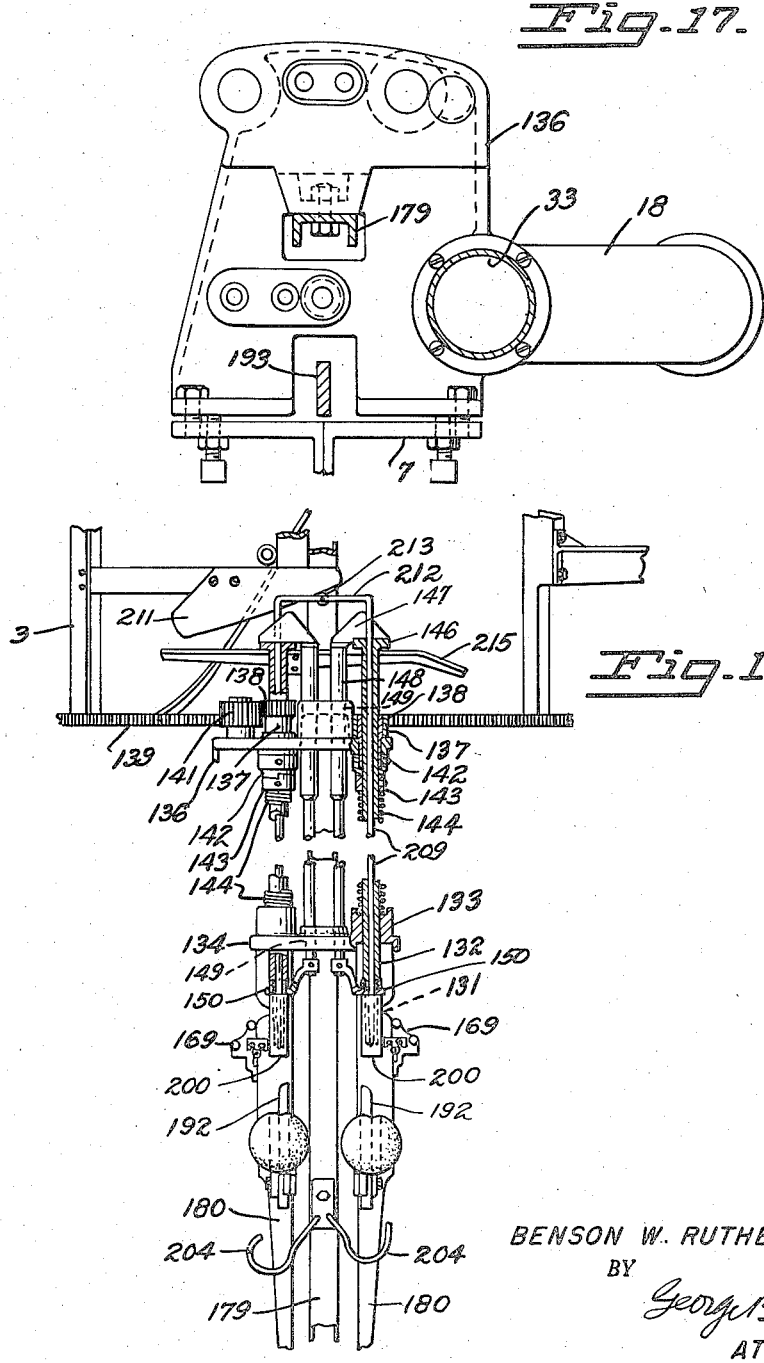

Nov. 13, 1951 B. W. RUTHERFORD 2,574,761
PEELING MACHINE
Filed May 20, 1949 17 Sheets-Sheet 14

INVENTOR.
BENSON W. RUTHERFORD
BY
*George B White*
ATTORNEY

Nov. 13, 1951  B. W. RUTHERFORD  2,574,761
PEELING MACHINE
Filed May 20, 1949  17 Sheets-Sheet 15
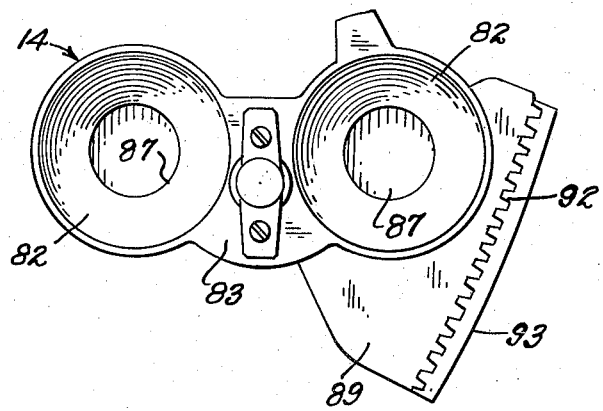
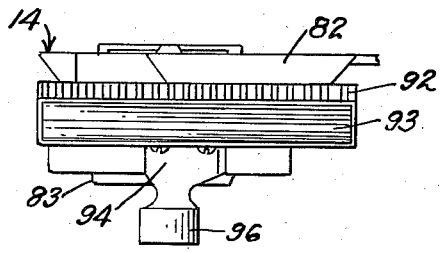
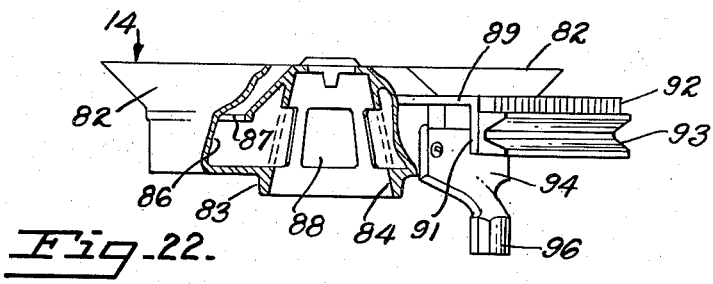
INVENTOR.
BENSON W. RUTHERFORD
BY
George B White
ATTORNEY Nov. 13, 1951     B. W. RUTHERFORD     2,574,761
PEELING MACHINE
Filed May 20, 1949     17 Sheets-Sheet 16
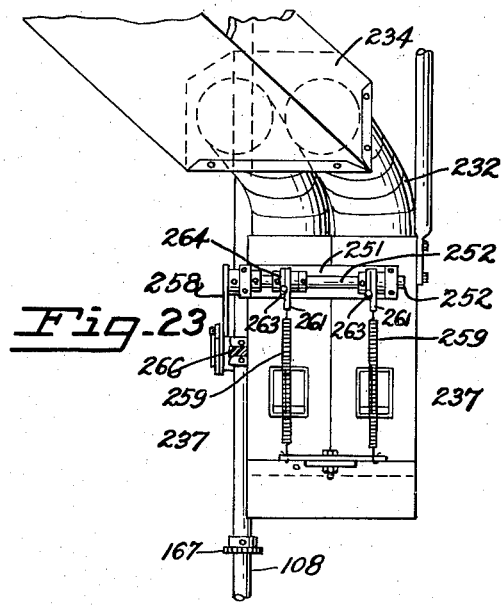
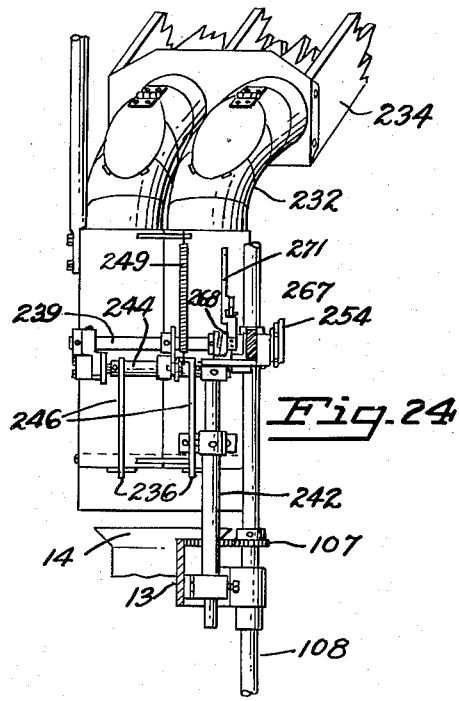
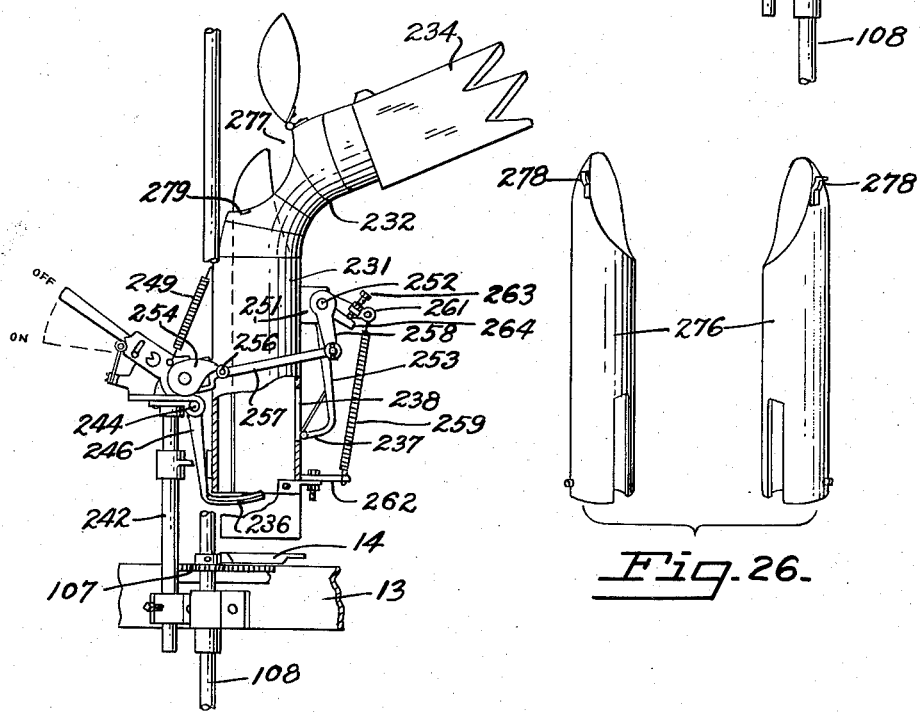
INVENTOR.
BENSON W. RUTHERFORD
BY
*George B White*
ATTORNEY Nov. 13, 1951  B. W. RUTHERFORD  2,574,761
PEELING MACHINE
Filed May 20, 1949  17 Sheets-Sheet 17

INVENTOR.
BENSON W. RUTHERFORD
BY
*George B White*
ATTORNEY

Patented Nov. 13, 1951

2,574,761

UNITED STATES PATENT OFFICE 2,574,761

PEELING MACHINE

Benson W. Rutherford, Sebastopol, Calif.

Application May 20, 1949, Serial No. 94,436

38 Claims. (Cl. 146—43)

This invention relates to a peeling machine.

Particularly the invention pertains to peeling machines for peeling apples, and the like, in such a manner that the apples are carried in cup-like holders in a suitable position to be engaged by elements of a peeling mechanism and peeled and cored thereby in successive automatic operations in continuous motion around the machine without the necessity of manual adjustments or handling.

Particularly an object of the invention is to feed and move holders to a loading position for receiving the fruit and then to pick up and carry the holders into alignment with a series of peeling mechanisms where the fruit is lifted from the cups for the performance of the peeling and coring operations thereon.

Another object of the invention is to provide peeling and coring mechanisms, the movements of which with the apples thereon are coordinated with the rotation of the machine in such a manner that they operate according to the position of cups or holders which deliver apples to such mechanisms while the cups as well as the peeling and coring mechanisms are moved around a central axis as a compact unit.

A further object of the invention is to provide a compact rotary machine wherein a plurality of mechanisms carry cups in suitable positions to a loading device for receiving the fruit, and then to a peeling mechanism, elements of which latter lift the fruit out of the cups and hold it in operative relations to suitable peelers and corers while the mechanism is carried around the machine; the cup carrying mechanisms being adapted to deposit the cups upon a track at said loading device guiding the cups to a fruit receiving position and then again picking up the cups after the same are loaded with the fruit and then moving the cups, and the fruit therein, into alignment with said elements of the peeling mechanism; the operations being performed in regular cycles during the uninterrupted movement of said units around a common axis.

Another object of the invention is to provide a group of peeling and coring mechanisms rotated as a unit about an axis, and to provide novel controls for the actuation of said mechanisms to perform their respective operations in predetermined cycles during their movement about said axis; and to provide fruit holder carriers movable with the respective mechanisms and also actuated in synchronized cycles so as to move the fruit holders to a loading position and then move the loaded holders to the respective mechanisms for holding the fruit in proper position to be engaged by the adjacent peeling mechanism for peeling and coring.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 2 is a perspective view of my peeling machine, viewing it from the side opposite from where the cups are loaded.

Fig. 3 is a perspective fragmental detail view of a peeling unit of my machine.

Fig. 3A is a sectional fragmental detail view of the top cam guide and the top of the carriage for the peeling unit.

Fig. 4 is a fragmental side view of a peeling mechanism and its cam control for fruit pickup, just before lowering to the apples.

Fig. 5 is a perspective view of the stationary skeleton frame of my machine.

Fig. 6 is a perspective detail view of the rotating frame of the machine.

Fig. 7 is a perspective view of the cap for the suction device of my machine.

Fig. 8 is another perspective view of said cap.

Fig. 9 is a somewhat diagrammatic plan view showing the relative positions of the cup and its carriage as it passed the loading position.

Fig. 17 is a detail plan view of the supporting bracket for the peeling mechanism.

Fig. 18 is a fragmental view partly in section of the peeling mechanism.

Fig. 20 is a plan view of a cup unit.

Fig. 21 is a side view of the cup unit facing the gear segment and drive groove thereon.

Fig. 22 is another side view of the cup unit, partly in section.

Fig. 23 is a rear view of the apple loader.

Fig. 24 is a front view of the apple loader.

Fig. 25 is a partly sectional side view of the apple loader.

Fig. 26 is a detail perspective view of the apple loader inserts.

Figure 1:
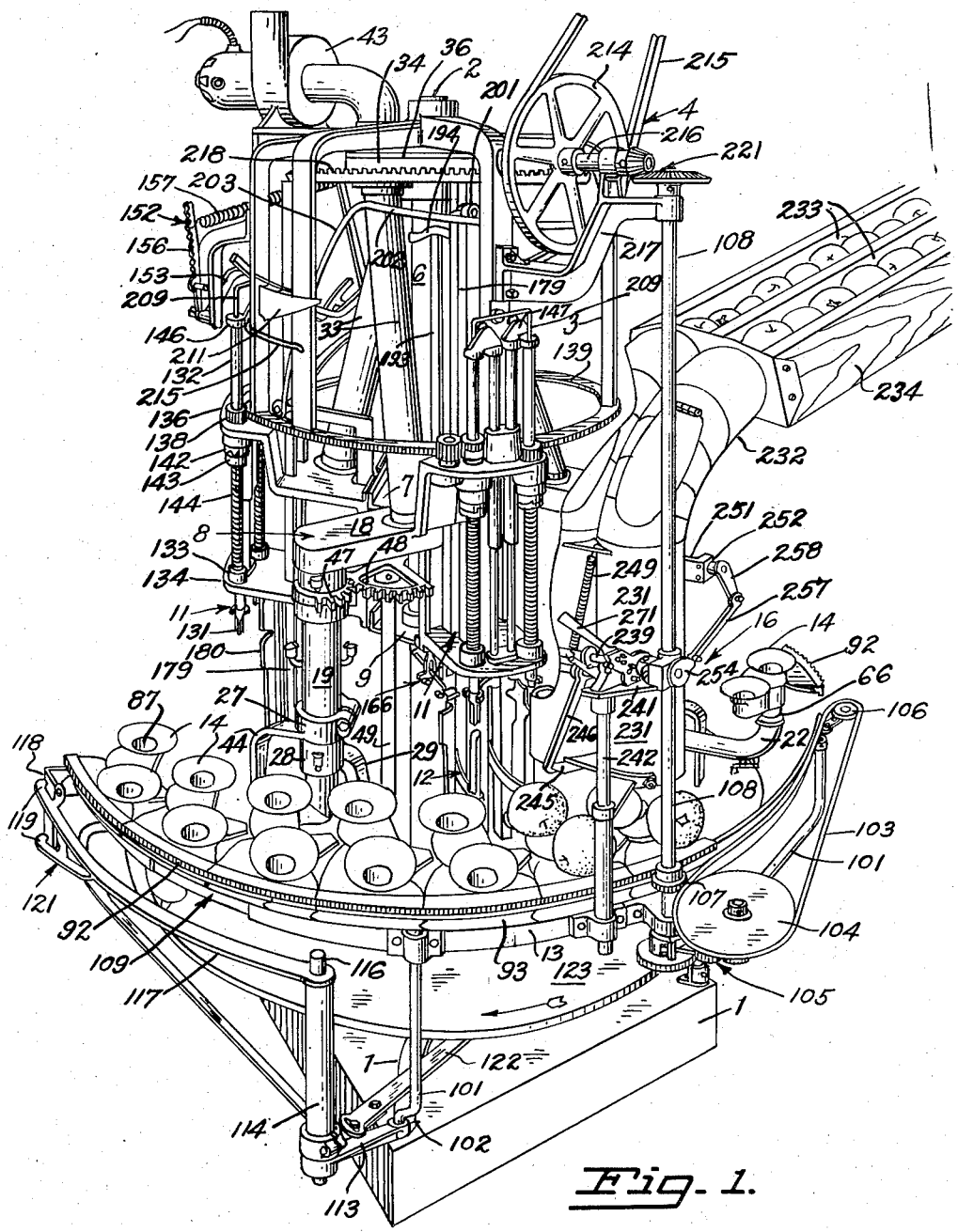
Fig. 1 is a perspective view of my peeling machine, viewing it from the side where the cups move toward the delivery end of the loading track.

In general the machine of my invention includes a base 1 and a central stationary column 2, as shown in Fig. 5, at the upper end of which is supported a cage 3, on the top of which latter is the driving mechanism 4. Around the central column 2 is rotatable on suitable bearings a tubular shaft 6, shown in Fig. 6, which rotates around the central axis of the column 2. From the tube 6 is extended a multicornered bracket 7 on which are supported suitable cup carrying devices 8, in this illustration also generally tubular. On a lower bracket 9 on the same column are also supported suitable peeling mechanisms 11 and coring mechanisms 12 which move in unison with the cup carrying devices 8, as the brackets 7 and 9 turn with tubular shaft 6. On one side of this entire rotating unit is a stationary track 13 on which the cups 14 are carried and held under a feeding mechanism 16 through which latter apples are dropped in pairs into the respective cups 14 which cups 14 are then picked up by said cup carrying devices 8 and moved into alignment with the respective peeling mechanisms 11 so that the suitable supporting elements of the peeling mechanism can pick the apples out of the cups for the peeling and coring operations as desired during one revolution of said machine.

There are three of such cup carrying devices 8 arranged on the central tubular shaft 6 and the description of one will suffice because they are identical. This cup carrying device is illustrated in various attitudes subassemblies and details in Figs. 1, 2, 4, 9, 11, 12, 13, 14 and 19. From the central driving tube 6 extends the bracket 7 on which is supported a bracket extension 17, which in turn supports a hollow arm 18. From this arm extends downwardly a tube 19. Into the lower end of the tube 19 is telescoped the vertical portion 21 of a substantially L-shaped tubular swinging arm 22. A coil spring 23 inside the vertical tube bears at one end against a flange abutment 24 and at its other end against the top 26 of said vertical portion 21 of the swinging arm 22 to normally urge the swinging arm 22 downwardly. The vertical tube 19 is rotatably supported by a collar 27 on a suitably packed bearing 28 on a base bracket 29, so as to be adjustable around its axis and swing the arm 22 around its axis and thus to hold said arm in various adjusted angular positions. The base bracket 29 is suitably mounted on a flange 31 on the ends of a spider arm 32 extended from the bottom end of the central tube 6, as shown in Fig. 6.

From the hollow arm 18 extends upwardly a conduit 33 which is connected to a vacuum chest 34 on the top of the rotating tube shaft 6. A valve disk 36 is held stationary on said top cage 3 and has an intake conduit 37 offset from its center. A cut away segment 38 of said disk 36 is about one third of its area. The vacuum chest 34 is divided into three circumferential compartments 39 and its top 41 has a hole 42 above each compartment, so aligned that each hole 42 aligns with the intake conduit 37 of the valve disk 36 in the position of the device when the corresponding cup carrier picks up one of the cups and each hole 42 is aligned with the cut away segment 37 and breaks the vacuum just before the apples are picked up by the peeling mechanism from the cups on the corresponding carrier. The conduit 37 is connected to a suitable motor driven suction pump or vacuum creating device 43 which is operated continuously to draw a vacuum through the respective tubular cup carrying devices and from the cups in succession as they are carried around on the tubular shaft 6 during a predetermined period of the cycle of operations.

From the collar 27 of the vertical tube 19 of said carrying device extends on one side a rod 44. From the swinging arm 22 extends a guide bar 46. The rod 44 is slidable in the space between the guide bar 46 and swinging arm 22, and urges the swinging arm to turn with the tube 19 but allows the swinging arm 22 and its vertical portion 21 up and down telescoping movement.

The turning of the swinging arm to its various positions is accomplished by a sector gear 47 on the outside of the outer tube 19 which gear 47 is in mesh with a driving sector gear 48 on a vertical shaft 49, which shaft 49 is journaled in bearings 51 and has a horizontal lever 52 on its lower end, from which extends a vertical roller 53 which moves in a horizontal stationary channel 54 around a cam 56 as the device is rotated around the axis of rotation. The cam 56 is so formed that it turns the lever 52 and rotates the vertical shaft 49, which turns the sector gears 47 and 48 and the tube 19, and the swinging arm 22. As shown in the diagram in Fig. 10 the swinging arm is held relatively stationary at the area A, at the time when it picks up a cup 14 from the tail end of the loading track 13, and then the outer end of the swinging arm with the cup is moved on an arc radially inwardly and rearwardly with respect to the direction of rotation as the device moves so as to bring the cup under the peeling device behind the pivotal axis of the respective swinging arms through area B and then to hold the cup in position under the peeling device through the forking area C and then gradually swing the swinging arm 22 outwardly until the cup 14 is deposited upon the track 13 at position D, and then moves the swinging arm 22 again slightly upwardly and finally back to the outward position at area A to pick up a loaded cup on the other end of the track, and then swinging the cup back again under the peeling mechanism and repeating the next cycle of operation.

The swinging arm 22 remains at about the same height throughout the cycle of operation up to the point D, and after the cup is deposited upon the track 13 the swinging arm 22 is lowered away from the cup 14. This control of the swinging arm 22 as to height is accomplished by means of a fulcrum lever 57 fulcrumed on a transverse pivot 58 on a collar bracket 59 on the central tube 6. A downwardly extended crank arm 61 of said fulcrum lever 57 has a follower roller 62 riding on another stationary cam 63 under a thrust bearing 64 on the frame of the machine. As the carrying mechanism rides around the central axis the cam 63 holds the arm 61 out and the fulcrum lever 57 up, until it reaches position D, at which time the fulcrum lever 57 is dropped down and pressed by the coil spring 23 and thereby disengages the cup 14. The follower roller 62 following the contour of the second cam 63 moves the fulcrum lever 57 up at about the position of the swinging arm 22 near the delivery end of the track 13 to lift the swinging arm 22 when it is turned radially outwardly of the device at the area A into the bottom of a cup 14, as hereinafter described, to carry said cup 14 at said height while the cup is released from the track 13 and then hold the cup 14 under the peeling mechanism and at said height as heretofore described.

Figure 13:
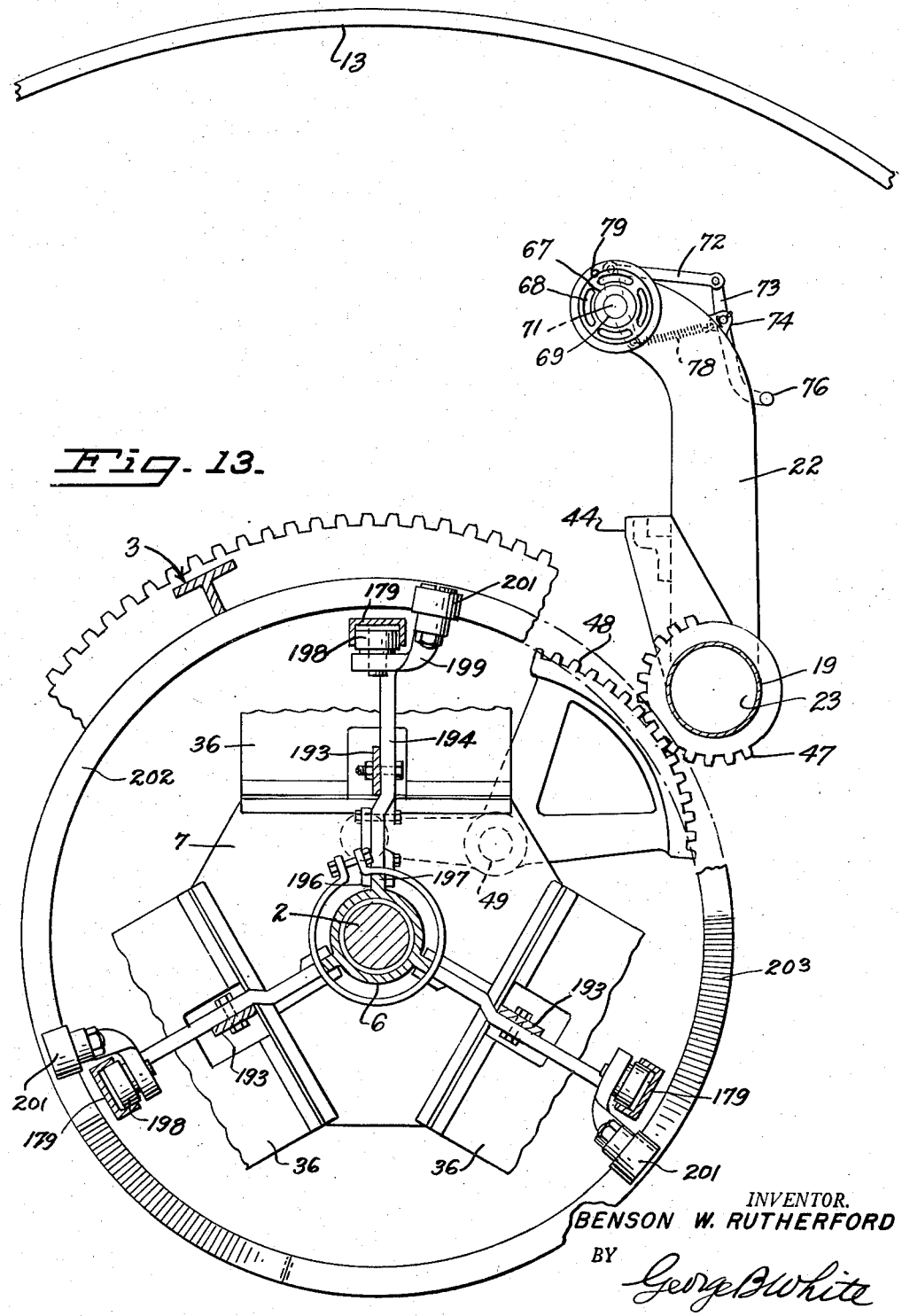
Fig. 13 is a fragmental top plan view illustrating the turning control of the cup carrying swinging arm.
Figure 14:
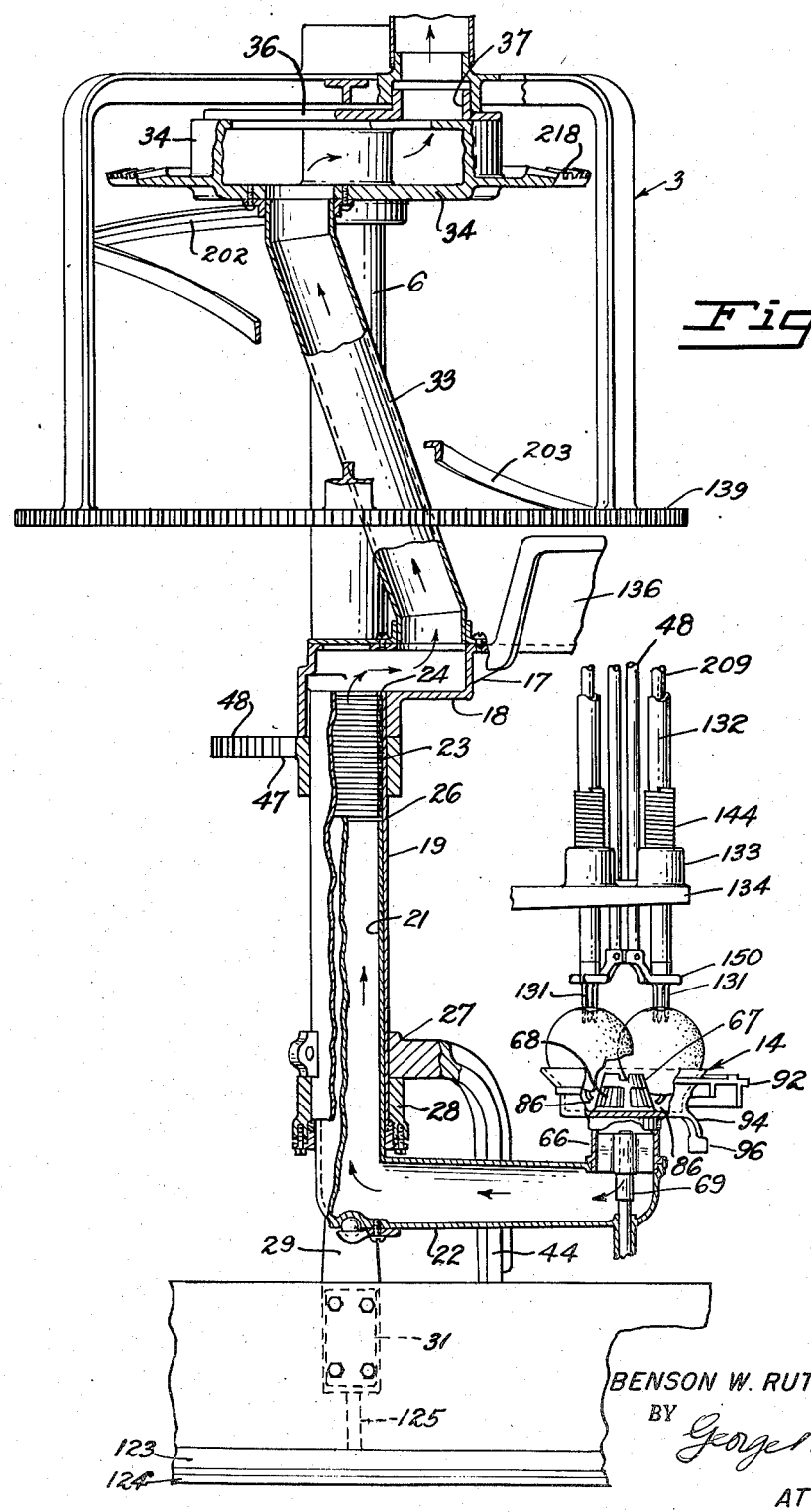
Fig. 14 is a partly sectional view showing the suction control for the cups.

For engagement with the cup 14, each swinging arm 22 has on its free end an upwardly extended sleeve 66, as shown in Figs. 9, 13 and 14, on the top of which is rotatably supported a hollow supporting pin or spindle 67. The pin 67 is frusto-conical and has a plurality of spaced ports 68 around its side, so that a continuous communication is established from the cup 14 through the swinging arm 22, vertical portion 21, hollow arm 18 and the inclined top tube 33 to and from the suction chest 34.

Figure 15:
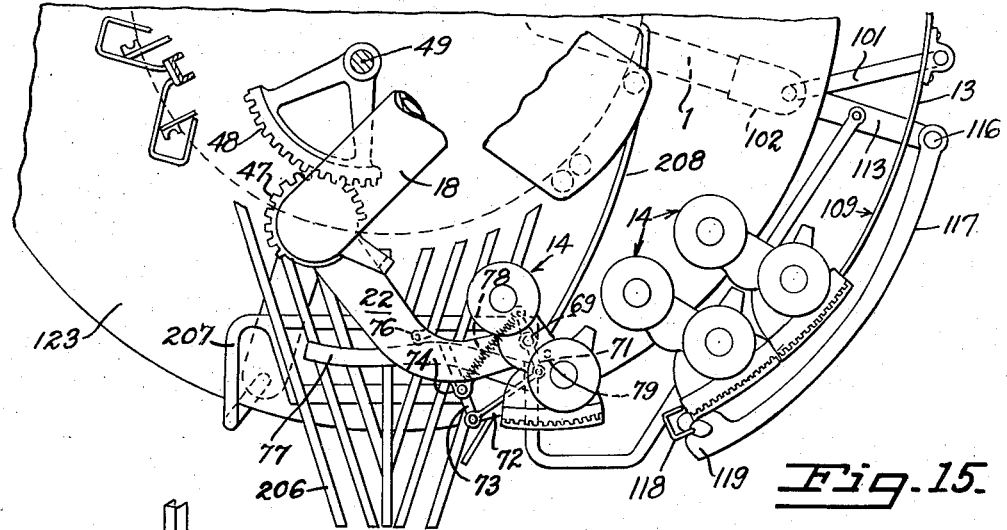
Fig. 15 is a fragmental plan view of the discharge portion of the machine.
Figure 16:
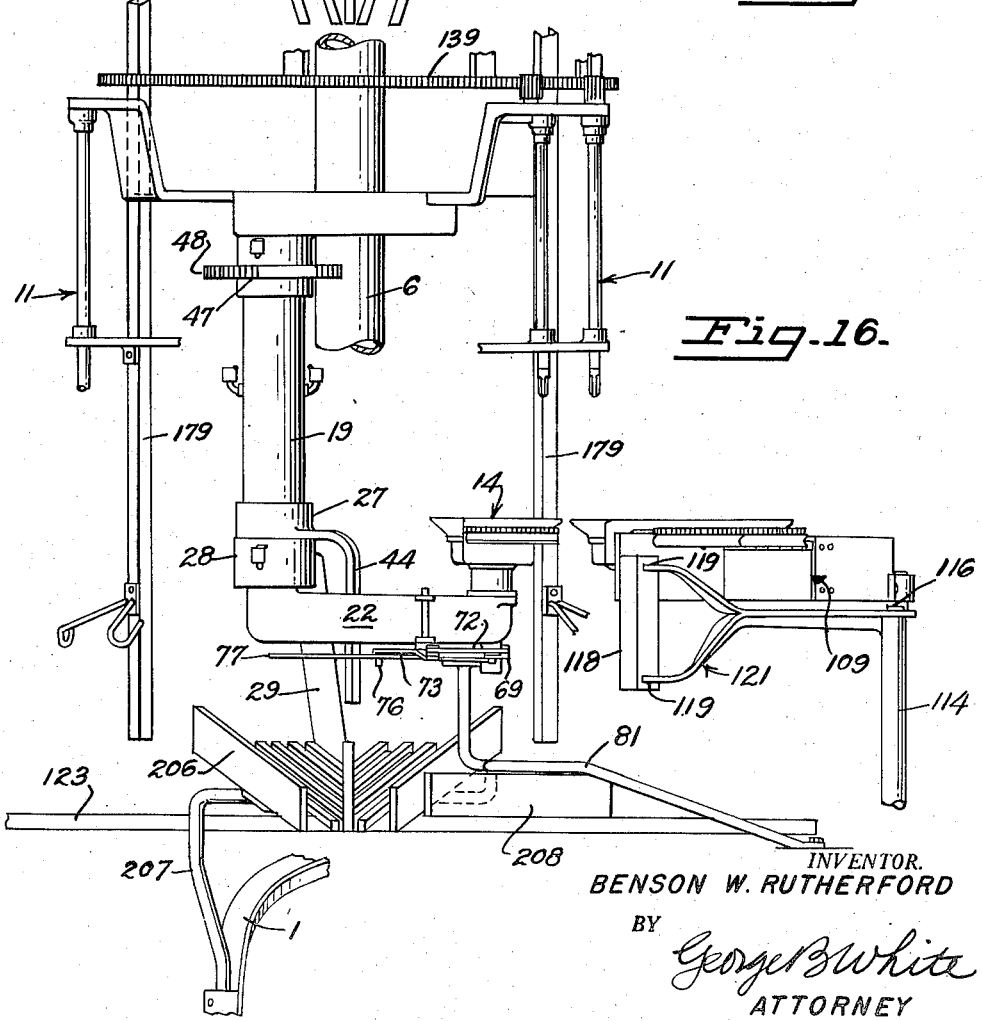
Fig. 16 is a fragmental side view of the delivery side of the machine.
Figure 19:
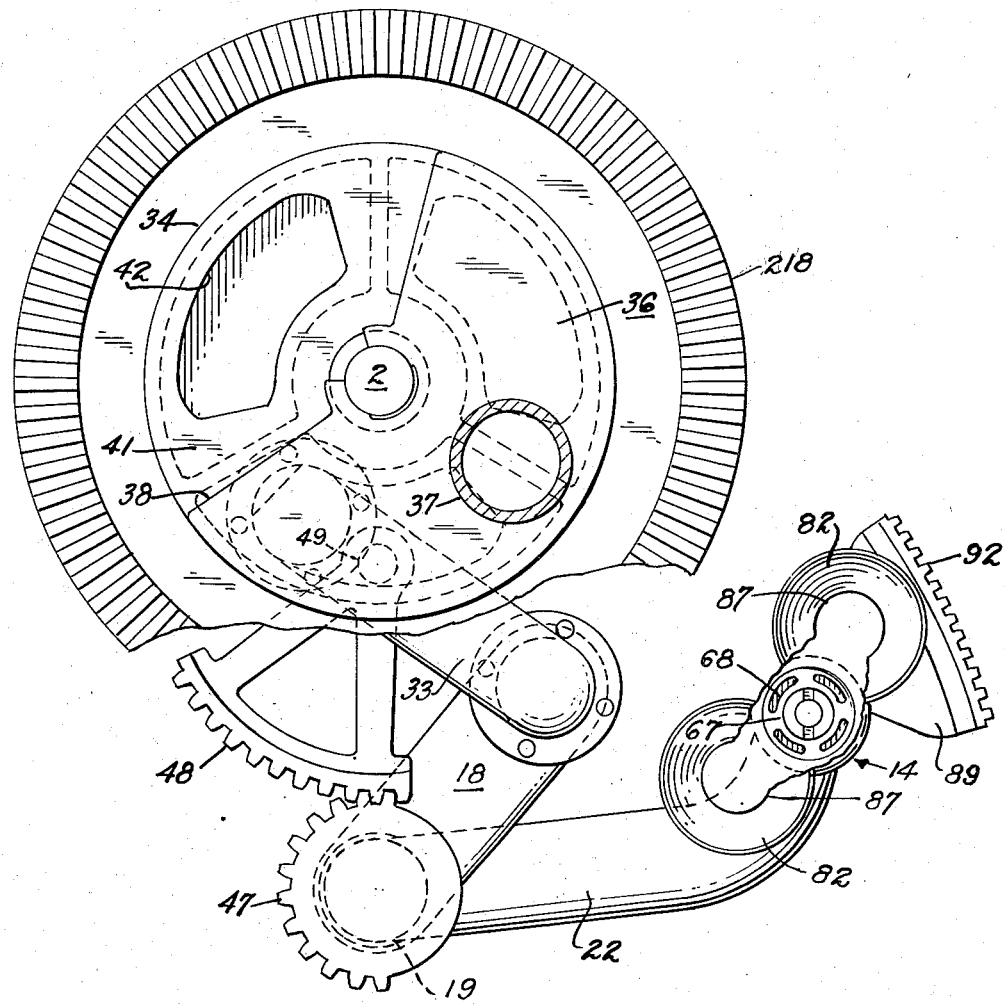
Fig. 19 is a fragmental plan view of the cup turning mechanism in relation to the suction control.
Figure 27:
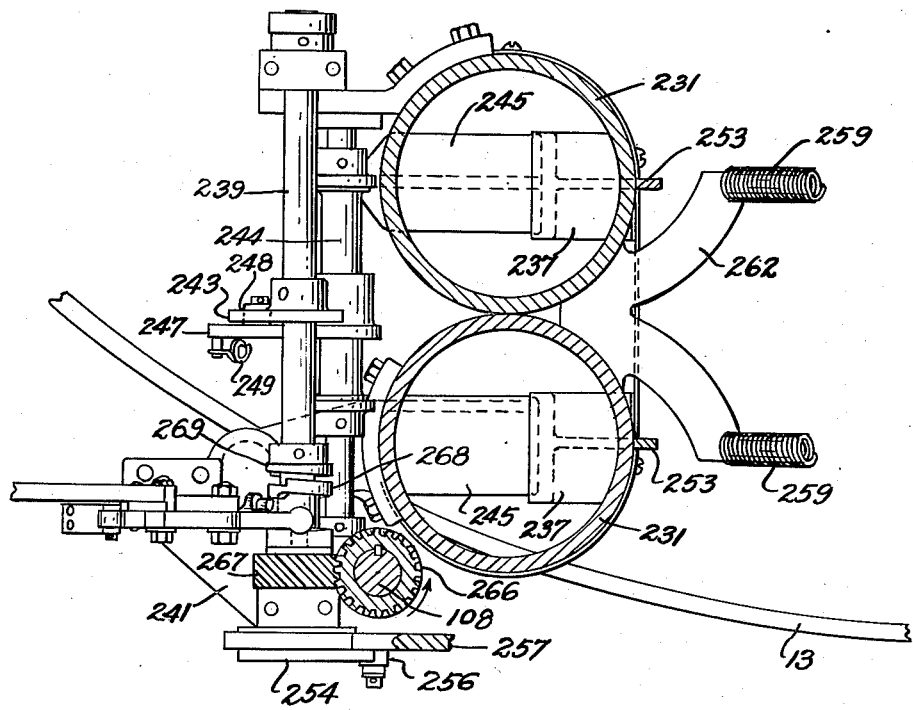
Fig. 27 is a sectional plan view of the apple loader.
Figure 28:
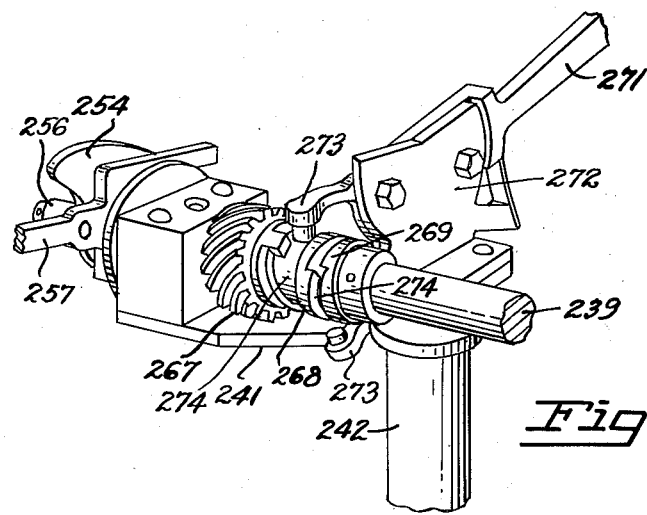
Fig. 28 is a fragmental perspective view of the clutch device for the apple loader.

In order to turn the cup 14, as it leaves the track 13, to a position of alignment with the adjacent peeling mechanism, the pin 67 has a shaft 69 extended from its base and out through a bearing in the bottom of the swinging arm 22. On the lower outer end of this shaft 69 is a cross arm 71, as shown in Figs. 9 and 15, one end of which is connected by a link 72 to the end of an operating lever 73, fulcrumed on an ear 74 on the bottom of the swinging arm 22. The other end of this operating lever 73 is curved outwardly and terminates in an abutment 76 to ride on the inside of a short cam strip 77, shown in Figs. 15 and 16. A coil spring 78 is connected to the other end of the cross arm 71 and to the fulcrum ear 74 to normally turn the cross arm 71 and the pin 67 into a position where the cup 14 thereon is generally tangential to the circle of rotation of the device and aligned with the peeling mechanism. A stop pin 79 extended from the bottom of the swinging arm 22 is positioned to stop the cross arm 71 in said aligned position. The cam strip 77 is supported on a bracket 81 and is positioned and curved to prevent the sudden snapping of the pin 67 and the cup 14 thereon, when the latter is released from the loading track 13, and to guide the operating lever 73 to a gradual turn under the urging of the coil spring 78.

The fruit holders or cups 14, herein are shown in detail in Figs. 20, 21 and 22. Each fruit holder 14, in this illustrative embodiment, has two conical cup-like receptacles 82, which are spaced from one another on a hub 83. In the bottom of the hub 83 is a conical socket 84 which fits over the conical pin 67 on the swinging arm 22. The portions of the hub 83 forming base 86 of the cup-like receptacles 82 are hollow and each receptacle 82 has a large opening 87 in its bottom. The socket 84 has slots 88 through its side aligned with the ports 68 of the pin 67, to establish communication from the cup-like receptacles 82 to the suction system heretofore described.

Each fruit holder 14 has a bracket 89 extended from one side thereof, on the outer edge of which is an arcuate depending flange 91. Around the top edge of the flange 91 is formed a gear segment 92. Under this gear segment 92 is formed a belt groove 93 on an arc parallel with the gear segment 92. Spaced inwardly under the flange 91 is an ear 94 extended from the underside of the adjacent cup base, on the end of which is a foot rest 96 to bear against said loading track 13 for steadying the fruit holder 14 on said track.

Figure 10:
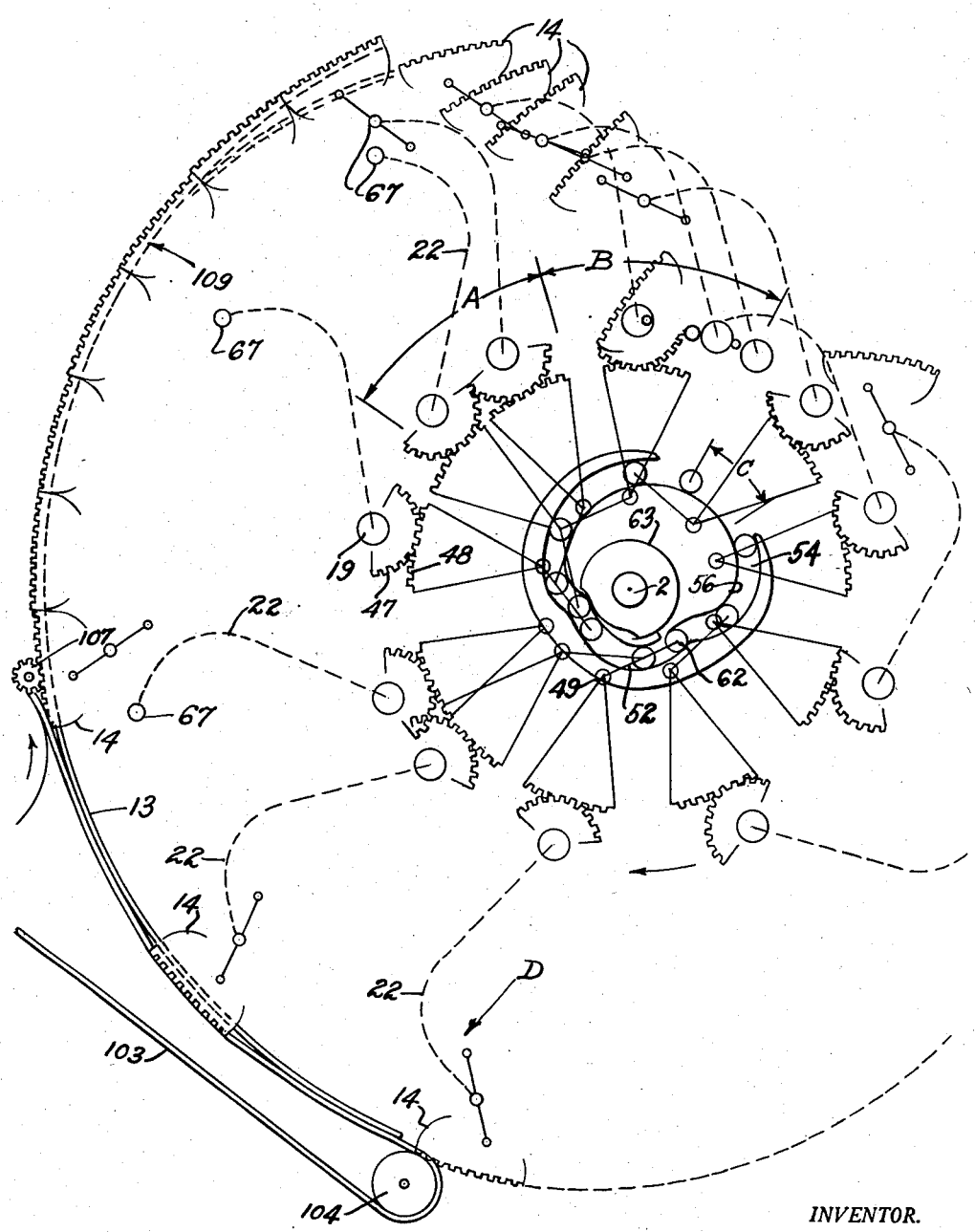
Fig. 10 is a diagrammatic view showing the control and turning of the cup positions substantially from their approach to and removal from the loading track.
Figure 11:
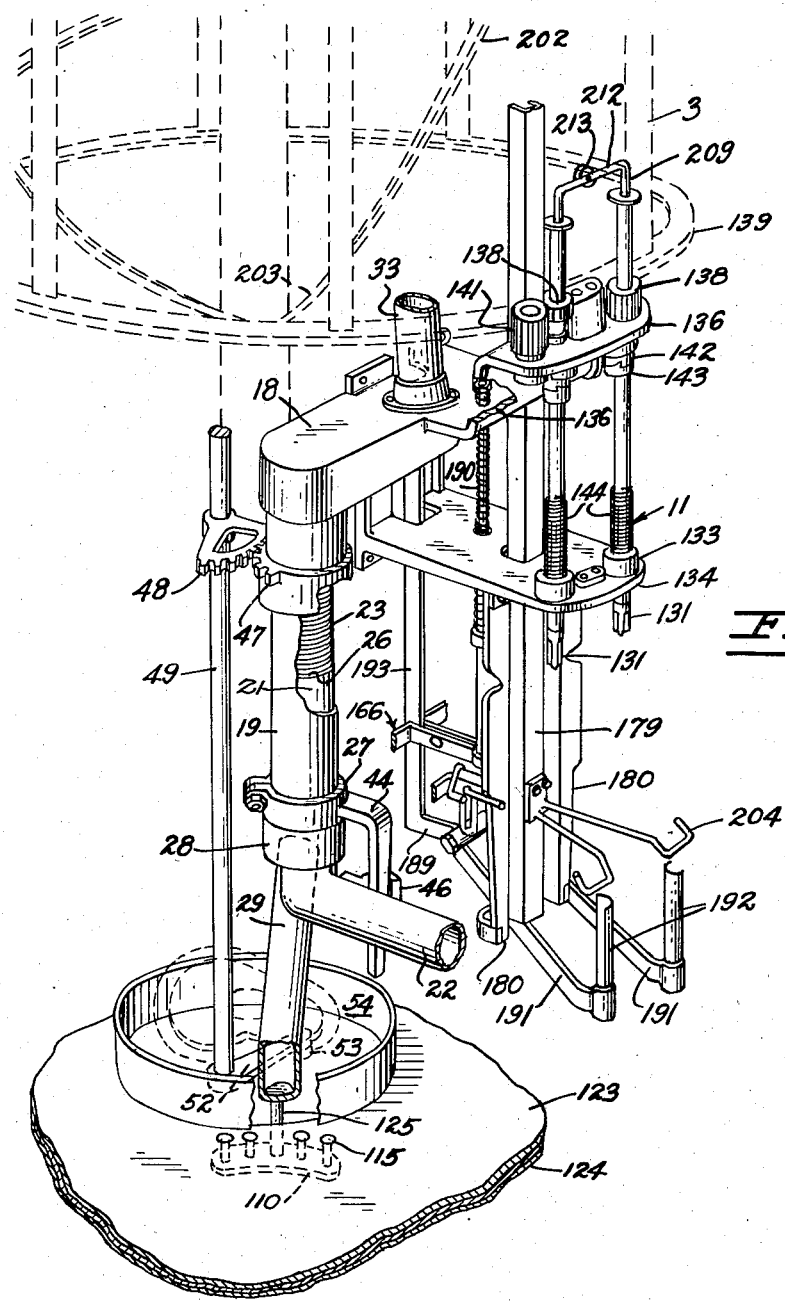
Fig. 11 is a fragmental perspective view of a peeling and coring unit and the adjacent cup carrying tube and mechanism.
Figure 12:
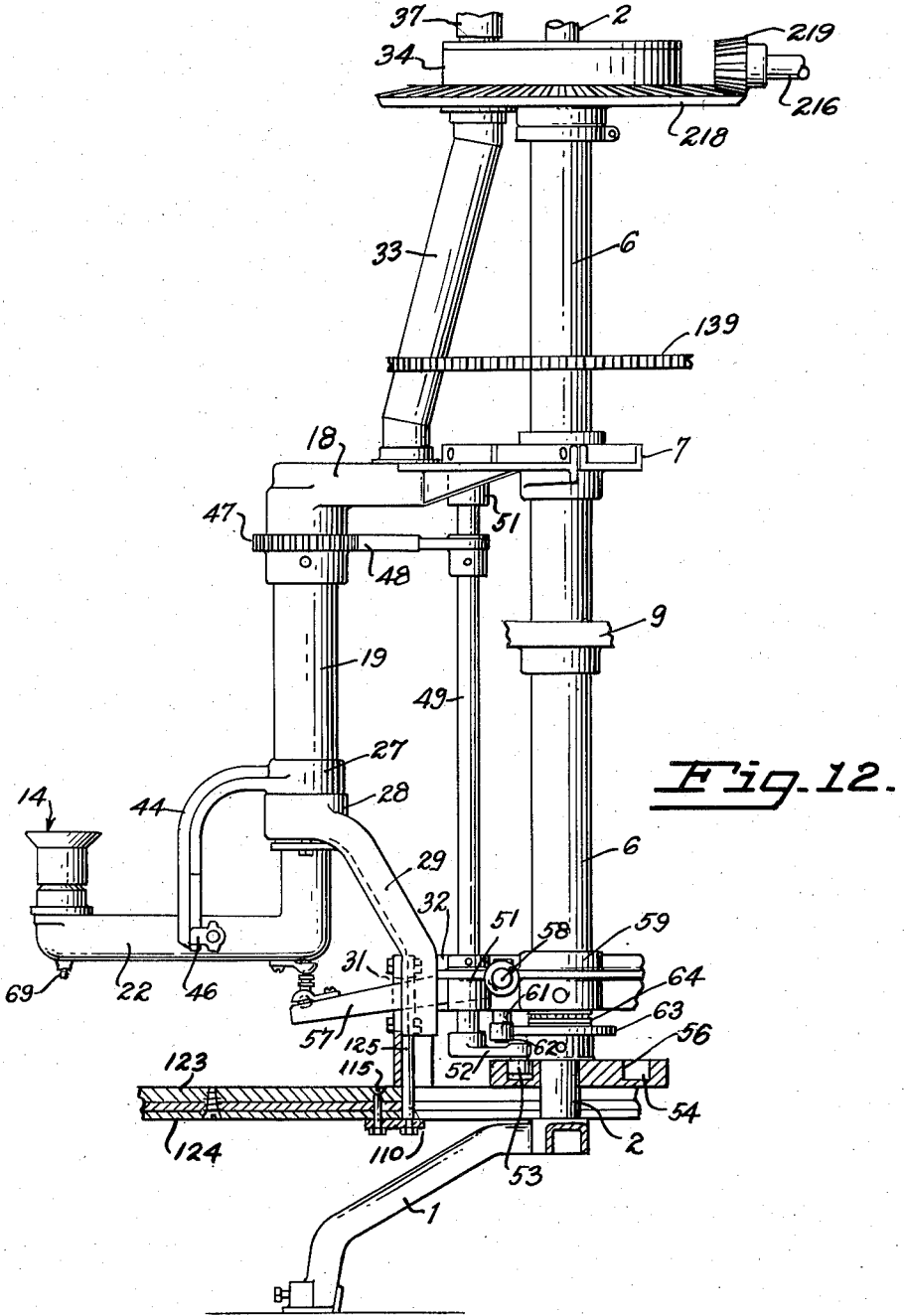
Fig. 12 is a fragmental side view showing the cup carrying arm and its tube, and its adjustable mounting and control on the rotor frame.

The track mechanism under the feeder is shown in Figs. 1, 9 and 10 and it includes the arcuate stationary track 13 which is generally concentric with the rotating axis of the cup carrying devices 8. The track 13 is supported on posts 101, extending upwardly from brackets 102 on the base or legs 1. The depending flange 91 of each fruit holder 14 engages the outside of the track 13, and the foot rest 96 is on the inside of the track 13. The swinging arms 22 bring the fruit holders 14 in the position where said flange 91 and foot rest 96 straddle the top of the track 13. A suitable drive device, such as a V belt 103 is held frictionally against the outer surface of the track 13 by a drive pulley 104 at about the middle of the track 13, and by an idler pulley 106 near the intake end of the track 13. When the fruit holder 14 is deposited on the track 13, its belt groove 93 is in registry with the belt 103 and the belt 103 draws the fruit holder 14 along said track 13 toward and to a pinion 107 at about the middle of the track 13. This pinion 107 is suitably driven by a vertical drive shaft 108 at a desired speed to move the holders 14 at a slower speed than the movement of the holder carrying mechanisms around the central axis. The gear section 92 of the fruit holder 13 is pushed by the belt 103 into engagement with said pinion 107 so that the fruit holder 14 is driven and pushed by said pinion 107 along the discharge portion of the track 13 at a predetermined speed. After each of said fruit holders 14 is passed beyond said pinion 107 it is pushed along by the next successive fruit holder 14 so that a row of such fruit holders 14 passes along the track 13 all the time. Near said pinion is the feeding mechanism 15 through which the apples are passed, by a suitable mechanism to be hereinafter described, into an aligned set of cups thereunder. The fruit holders 14 so filled are then pushed along toward the discharge end of the track 13. The drive pulley 104 is driven by a suitable transmission gearing 105 from the shaft 108.

The discharge end 109 of the track 13 is made of flexibly connected sections 111 on a spring arm 112 on the track 13 so as to be yieldable inwardly. The purpose of this yieldable play for the track 13 is to allow for the inward swinging of the fruit holders 14 and the turning of the fruit holders 14 after they are reengaged by the respective swinging arms 22 as heretofore described.

The turning of the swinging arm 22 as heretofore described exerts an inward pulling force on the fruit holder 14 and on the yieldable discharge end or tail 109 of the track 13, but for further assuring gradual release and turning of the fruit holder 14 a positive cam controlled device is provided for pushing said discharge end 109 inwardly every time a swinging arm 22 moves past the same. An extension bracket 113 extends from one of the base brackets 102 and supports a vertical journal 114 outside the track 13. A fulcrum pin 116 in the journal 114 is fixed on the bracket 113. A lever 117 extends from the top of the journal 114 along the outside of the track tail 109. At the tip of the track tail 109 is a bracket 118 which is engaged by claw tips 119 of a forked end 121 of said lever 117. The lower end of the journal 114 has a crank lever 122 fixed thereon extended to below a rotating peeling deck 123, to the periphery of a flat cam plate 124. A follower roller 126 on said lever 122 is in contact with the periphery of the cam plate 124. This cam plate 124 rotates with the carrying devices 8 and is so shaped that it turns the journal 114 and the lever 117 inwardly as a carrying device 8 picks up a fruit holder on the discharge end or track tail 109 and carries it around as heretofore described. The spring arm 112 on said discharge end 109 urges the lever 117 outwardly and keeps the follower roller 126 in contact with the periphery of the cam plate 124. Three spaced plates 110 are secured to the underside of the cam 124 by screws 115 which hold the peeling deck 123 and the cam 124 together. A suspending bar 125 extended downwardly from each base bracket 29 is secured to each plate 110 so as to securely suspend the peeling deck 123 and the cam 124 on the rotating units.

At the same time, at about the position A of the cycle of operation shown in Fig. 10, the outer end of the swinging arm 22 and the supporting spindle 67 thereon remain substantially stationary for a brief period after the moment of reengagement of the spindle 67 with the socket 84 of the fruit holder 14 so that the vertical fulcrum axis of the swinging arm 22, namely the vertical tube 19 advances relatively to the spindle 67. This is controlled by the sectors 47 and 48 and the cam 56. The result is a trailing rearward and arcuate inward movement of the outer end of the swinging arm 22 and of the spindle 67 thereon, pulling the fruit holder 14 correspondingly. This inward movement is compensated for by the inward yielding of the track tail 109. As the fruit holder 14 is also held on the track tail 109, it is thus gradually turned into a position substantially tangential with respect to the circle of rotation of the carrier mechanisms, and prevents the sudden snapping of the fruit holder 14. This action in combination with the action of the cam strip 77 heretofore described renders the alignment of the fruit holders 14 with the respective peeling mechanisms gradual but accurate and does not disturb the position of the suction held apples therein.

Each peeling mechanism 11 includes a pair of so called forks 131, spaced from one another correspondingly to the spacing of the pair of cups in the fruit holder 14. These forks 131 at present are in the form of prongs supported on a spindle stem 132, which latter are vertically slidable in bearings 133. On the brackets 7 and 9, at each peeling mechanism, is a support formed with a pair of vertically spaced platforms 134 and 136. In the upper platform 136 is a rotatable bushing 137 surrounding the spindle stem 132. A pinion 138 on the rotatable bushing 137 rides on a stationary ring gear 139 on the cage 3 and is rotated thereby as the unit travels. The other bushing 137 of each pair has its pinion 138 rotated through an idler pinion 141 journalled on the upper platform 136 and riding on said gear ring 139 and in mesh with the second pinion 138. Thus the rotatable bushings 137 of each pair rotate in opposite directions to one another. On the bottom of each rotating bushing 137 is a hollow clutch 142 facing downwardly. On each spindle stem 132 is a complemental clutch collar 143 engaged with the adjacent hollow clutch 142 for transmitting rotation to the spindle stem 132. A coil spring 144 around each spindle stem and between the lower bushing 133 and the clutch collar 143 normally urges the spindle stem upwardly and the clutch collar 143 into engagement with the clutch 142. The top of each spindle stem 132 extends above the pinion 138 and has an abutment head 146 thereon. A cam follower head 147 engages each abutment head 146 and is on a sliding rod 148, which latter slides through suitable holes 149 in the bracket platforms 134 and 136. The lower end of each rod 148 has on it a stop 150 extended over the adjacent spindle stem 132 just above the prong or fork 131, for limiting the distance of penetration of the fork 131 into the apple.

The cam follower head 147 is of generally triangular outline and has a roller 151 on a corner thereof for engagement with a cam device 152 on the cage 3 so as to be depressed thereby for lowering the spindle stems 132 and pushing the prongs or forks 131 into the apples in the aligned receptacles of the fruit holder 14 below it. As the spindle stems 132 move downwardly the clutch collar 143 is withdrawn from the bushing clutch 142 and the spindle stems 132 cease to rotate during the period of penetration into and picking up of the apples. The cam device 152 is aligned with the so called forking area c of Fig. 10, namely at the portion of the cycle where the fruit holder 14 is held in alignment with the forks 131 of the peeling mechanism. As the cam followers 147 leave the cam device 152, the coil springs 144 push the spindle stems 132 upwardly and reengage the clutch collar 143 with the bushing clutch 142 for rotating the apples during the peeling operation. It is to be noted that the timing of the suction at the vacuum chest 34 is such that the suction on the apples in the fruit holder 14 is cut off at the forking area c, and at about the moment of the lowering of the forks into the apples.

The cam device 152 is adapted to compensate for different resistances offered to the forks 13, and thus to adjust the stroke according to the size of the apple. This is accomplished by a pair of separate cam bars 153 offset with respect to one another, but generally parallel so as to act simultaneously on the respective cam follower head 147. The cam follower heads 147 are offset correspondingly to said cam bars. Each cam bar 153 is separately supported at an end thereof on a bell crank lever 154 journalled on the cage 3 at opposite ends of the cam device 152. The upper ends of the outer arms 156 of the bell cranks 154 are connected to one another by a coil spring 157, which holds the cam bars 153 in a normal initial position. Any excess resistance to fork penetration over the normal will push the cam bars 153 upwardly against the action of the coil spring 157.

The peeling blades 161 of the peeling mechanism, as shown in Fig. 3, are of a usual type, having a knife 162 and an opposed guard 163 mounted on a bar 164. A blade carriage 166 has a pair of oppositely extended U shaped brackets 167 suitably secured together back to back. In the outer ends of each bracket 167 is journalled a shaft 168. On the end of the shaft 168 nearer to the peeling blade 161 is fixed a cam follower element 169. On the other end of the shaft 168 is a rear support lug 171. The blade bar 164 extends through a vertical slot 172 in the cam follower element 169 and through a journal hole 173 in the rear lug 171. To the rear end of the blade bar 164 is secured a serrated arm 174. From the cam follower element 169 also extends a serrated arm 176. A coil spring 177 anchored at its ends to the respective serrated arms 174 and 176 holds the blade bar 164 and the peeling blades thereon resiliently yieldably in position, so that as the peeling blade 161 is turned around the rotating apple it is resiliently urged against the contour of the apple.

A channel iron 179 extends vertically from the top to the bottom of the rotating units and rotates with the unit. On each side of the channel iron 179 is a vertical cam bar 180 fixed to the platform 134 and spaced on opposite sides of the channel iron 179. The outer edge of each cam bar 180 is formed into a cam 182 on which the cam follower 169 of the peeler carriage rides. The cam 182 dips inwardly in a notch 183 so that the bracket 169 and the peeler blade is turned upside down when it reaches the top portion of the apple and peels there efficiently.

From the center of the peeler carriage 166 extends upwardly a suspending rod 184 which extends slidably through the bracket platforms 134 and 136 and is suspended in its lowered position on a top nut 186 which rests on a cushion spring 187 on the top platform 136, and is pressed downwardly by a coil spring 190 around it bearing at its bottom end against a collar 188 on the rod and at its upper end against the underside of the upper bracket platform 136.

The peeling carriage 166 is a secondary carriage and is lifted up by a primary or corer carriage 189, normally spaced below the peeling carriage 166. A pair of corer brackets 191 extend from the corer carriage 189 and through the respective spaces between the vertical bars 180 and the channel 179. On the free end of each corer bracket is a vertical corer blade 192 generally opposite the respective forks 131. A vertical supporting bar 193 is slidable through the platforms 134 and 136 and supports the primary carriage 189. On the top of the vertical support bar 193 is a cross head 194. A forked traveler 196 at the inner end of the cross head 194 rides on a guide 197 along a side of the center tube 6. On the outer end of each cross head 194 is a roller 198 on a horizontal radial axis riding in the channel iron 179. Thus the carriage suspending bar 193 is properly braced at the top. On an offset arm 199 extending from the cross head 194 is a cam follower roller 201, which rides on a generally circular carriage cam 202 fixed on the top cage 3. This carriage cam 202 has a downward dip 203 substantially above the forking area C shown in the diagram in Fig. 10, so that the carriage suspending bar 193 and the carriages 189 and 166 are in their lowest position below the apples during the cycle of operation where the forks 131 pick the apples out of the cups 14. Thereafter the carriage cam 202 rises gradually during the peeling operation. This rise first raises the corer carriage 189, until the latter engages the secondary peeler carriage 166 and then the carriages move together upwardly, the peeling blades 162 peeling the rotating apples and the corer blades 192 penetrating into the rotating apple adjacent the apple core. The carriages and the entire peeling and coring mechanism remain in the elevated position throughout the remaining cycles until said forking area C is approached, where the carriages are lowered again. The peeled apples are then impaled upon the corer blades 192 and are lowered therewith, past fixed stripper loops 204 near the lower end of the channel 179, which push the apples off the corer blades 192 and unto a discharge chute 206 held on bracket bars 207 on the base or legs 1, at about the position where the swinging arm turns the holders 14 toward the forks 131. On one side of the chute 206 is a peel sweeping shield 208 also held fixed, so that as the peeling deck 123 rotates around, the apple peelings thereon are guided and swept by the shield 208 off the deck 123 and into any suitable waste conveyor or receptacle, not shown.

The core 200 of the apple usually sticks on the fork 131. In order to clean the fork 131, an ejector bar 209 extends through the tubular spindle stem 132, and is pushed downwardly by an ejector cam 211 just before the forking operation and after the apples are lowered with corer blades 192. The ejector bar 209 pushes the apple core off the fork 131. To facilitate control, adjacent ejector bars 209 are connected by a connecting piece 212 which latter carries a follower roller 213 which in turn rides on the downwardly inclined ejector cam 211. This ejector cam 211 is fixed on the top cage 3. A holding bar 215 is under the abutment heads 146 of the spindle stems 132 so as to prevent the stems 132 from being pushed down by the ejector bars 209. The ejector bars 209 are pushed up by the apples when the forks 131 penetrate into the apples.

The driving mechanism 4 includes a suitable pulley 214, driven by a belt 215 or the like. The pulley shaft 216 is journalled on the cage top 3 and on top bracket 217. A bevel gear 218 on the bottom of the vacuum chest 34 is connected to the central tube 6 and transmits rotation to the device. A pinion 219 on the pulley shaft 216 rotates the bevel gear 218. Another bevel gear transmission 221 on the outer end of the pulley shaft 216 and on the bracket 217 transmits synchronized rotation to the loader drive shaft 108. Thus all the related parts and mechanism move in synchonism through the cycles of operation for loading, picking up, peeling, coring and ejecting the apples, as heretofore described.

The feeding mechanism 16 is above and to one side of the loading track 13, at about the point where each holder 14 is engaged with the loading gear 107 on the vertical drive shaft 108. Aligned with this loading position of the holder 14 are a pair of parallel feed tubes 231 suitably supported from above the machine. The tops 232 of the tubes 231 are curved over and secured into the respective feed channels 233 of an overhead trough 234. The apples from the trough channels 233 roll down into and stack in the tubes 231, so that when released at the proper time they drop in the respective receptacles of the holder 14 below the tubes 231.

The dropping out of the apples from the bottoms of the tubes 231 is controlled by abutment fingers 236 which normally hold the lowermost apples in the tubes until the fingers are withdrawn to allow these apples to drop. In order to prevent the dropping of more than one apple at a time from each feed tube, an upper separator finger 237 is provided on each tube spaced above the lower finger 236 at a suitable distance to engage the apple above the lowermost apple when this upper separator finger 237 is inserted through a side hole 238 of the feed tube 231. The movement and operation of the lower and upper fingers 236 and 237 is so coordinated that just before the lower finger is withdrawn to allow the dropping of the lowest apple, the upper finger 237 is inserted to hold the next apple above in the tube. When the lower finger 236 is moved back to its initial position beneath the tube, the upper finger 237 is withdrawn from the tube to allow the next apple to drop to the lower finger 236. This operation is synchronized with the movement of the holders 14 on the loading track 13, and thus synchronized with the cycle of operation of the entire machine, so as to render the machine entirely automatic.

The control mechanism of the fingers includes a cam shaft 239 mounted in suitable bearings on a bracket 241, which latter is secured to the front side of the loading tubes 231 and on a post 242 fastened to the loading track 13 out of the way of the moving holders 14. On the cam shaft 239 is an eccentric cam 243 intermediate the ends of the cam shaft 239. Below the cam shaft 239 and parallel therewith is journalled a front fulcrum shaft 244. The stems 246 of the front or lower fingers 236 are fixed to the fulcrum shaft 244. A follower arm 247 extends from the fulcrum shaft 244 and has a follower roller 248 thereon held in contact with the periphery of said eccentric cam 243 by the action of a coil spring 249, anchored to the arm 247 and to the loading tube above said shafs, so as to normally pull the arm 247 upwardly toward said eccentric cam 243. The oscillation of front fulcrum shaft 244 swings the lower fingers 236 out from under the loading tubes 231 and back.

On the opposite or rear sides of the loading tubes 231 is another bracket 251 on which is mounted a rear fulcrum shaft 252. The stems 253 of the upper fingers 237 are pivoted on this rear fulcrum shaft 252 so that the upper fingers 237 move in and out of the tubes 231 as the rear fulcrum shaft 252 is oscillated. An end cam 254 on the cam shaft 239 is followed by a peripheral follower roller 256 on a follower link 257 which in turn is pivoted to a crank arm 258 on the end of the rear fulcrum shaft 252. A coil spring 259 on a lever arm 261 of each rear finger stem 253 is anchored on a bracket 262 mounted on the lower ends of the tubes 231. A set screw 263 on each lever arm 261 bears against a fixed lug 264 on the rear fulcrum shaft 252, so that the action of the springs 259 normally urges the rear fingers 237 inwardly of the tubes 231 and urges the follower link 257 and roller 256 against the end cam 254. The eccentricity of the middle cam 243 is opposite to that of the end cam 254, so that when one set of fingers is inside the tube the other set is out of the way.

The driving of the cam shaft 239, in this illustration is accomplished by a helical gear 266 on the vertical loader drive shaft 108 which drives a gear 267 rotatable on the cam shaft 239. A slide clutch 268 rotating with said gear 267 is slidable on the cam shaft 239 against a complemental clutch member 269 fixed on the cam shaft 239 so that when the clutch is engaged the cam shaft 239 is rotated in synchronism with the remaining mechanisms of the peeling machine, yet the clutch can be quickly disengaged to stop the loading of apples on holders at will.

The cam shaft clutch is controlled by a clutch lever 271 pivoted on a vertical plate 272 on the front bracket 241. Offset prongs 273 on the end of said clutch lever 271 are adapted to extend in grooves 274 respectively on the opposite sides of the slidable clutch 268. The grooves 274 are slanted oppositely to one another, so as to push the sliding clutch 268 in opposite directions according to the alternate insertion of the lever prongs 273 by the turning of the clutch lever 271 in opposite directions, while the slide clutch 268 rotates with the gear 267. Thus the operator can quickly control apple loading.

An insert tube 276 is insertable through a top aperture 277 on each tube 231. Each insert tube 276 conforms to inner shape of the outer tube 231 but reduces its inner diameter to accommodate smaller apples. Lugs 278 on the top of the insert tube engage notches 279 in the edge of the top aperture 277 to suspend and locate the insert tube in place.

An operator at the track 13 sets the apples in the cups in upright position before they are picked up by the swinging arm.

I claim:

1. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis, a device at said loading position of the holders for removing the holder from said holder carrying mechanism and to support said holder for receiving the fruit, means to shift said holders on said device to a position of reengagement by the holder carrying mechanism; and adjustable guiding means on said device at said reengagement position to guide each holder in its initial turning movement with said carrying mechanism when reengaged by the latter.

2. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis, a track at said loading position, coacting means on the holders and the track to support and guide said holders, a device for shifting said holders along said track past said loading position, means to disengage said holder carrying mechanism from said holder at said track and to reengage said holder carrying mechanism with said holder beyond said loading position, and a yieldable guide for the turning movement of said holder at the position where the holder is reengaged by said holder carrying mechanism.

3. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis, a track at said loading position, coacting means on the holders and the track to support and guide said holders, a device for shifting said holders along said track past said loading position, means to disengage said holder carrying mechanism from said holder at said track and to reengage said holder carrying mechanism with said holder beyond said loading position, and a yieldable guide for the turning movement of said holder at the position where the holder is reengaged by said holder carrying mechanism, said track being arcuate and being generally centered about said central axis.

4. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis, a device at said loading position of the holders for removing the holder from said holder carrying mechanism and to support said holder for receiving the fruit, means to shift said holders on said device to a position of reengagement by the holder carrying mechanism; and adjustable guiding means on said device at said reengagement position to guide each holder in its initial turning movement with said carrying mechanism when reengaged by the latter, and a loading device at said loading position actuated in synchronism with the holder movement on the track for depositing fruit in each of said holders.

5. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis, a device at said loading position of the holders for removing the holder from said holder carrying mechanism and to support said holder for receiving the fruit, means to shift said holders on said device to a position of reengagement by the holder carrying mechanism; and adjustable guiding means on said device at said reengagement position to guide each holder in its initial turning movement with said carrying mechanism when reengaged by the latter, suction means connected to the holders through said holder carrying mechanism, and means to actuate said suction means at the time of said reengagement and to cut off said suction means from said holders when opposite said peeling mechanism.

6. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis; an arcuate track at said loading position, an engagement element on each holder for slidably supporting the holder on said track, a driving device on said track for shifting the holder on the track past said loading position, and a control device actuated by the rotation of said holder carrying mechanism around said central axis to move said holder carrying mechanism for depositing said holder on said track and then for disengaging and reengaging said holder carrying mechanism from and with said holders respectively after the holder is deposited on the track and after the holder traveled past said loading position and for turning said holder carrying mechanism to align said holder with said peeling mechanism, successively during each revolution of said holder carrying mechanism around said central axis.

7. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis, an arcuate track at said loading position, an engagement element on each holder for slidably supporting the holder on said track, a driving device on said track for shifting the holder on the track past said loading position, and a control device actuated by the rotation of said holder carrying mechanism around said central axis to move said holder carrying mechanism for depositing said holder on said track and then for disengaging and reengaging said holder carrying mechanism from and with said holders respectively after the holder is deposited on the track and after the holder traveled past said loading position and for turning said holder carrying mechanism to align said holder with said peeling mechanism, successively during each revolution of said holder carrying mechanism around said central axis, a gear segment on each holder being generally concentric with said arcuate track, said driving device including a driving gear at said track for engaging said segment at said loading position to push the holder along said track, and a conveyor device on said track moving the holder from the end of the track where it is deposited by said holder carrying mechanism to said driving gear.

8. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis, an arcuate track at said loading position, an engagement element on each holder for slidably supporting the holder on said track, a driving device on said track for shifting the holder on the track past said loading position, and a control device actuated by the rotation of said holder carrying mechanism around said central axis to move said holder carrying mechanism for depositing said holder on said track and then for disengaging and reengaging said holder carrying mechanism from and with said holders respectively after the holder is deposited on the track and after the holder traveled past said loading position and for turning said holder carrying mechanism to align said holder with said peeling mechanism, successively during each revolution of said holder carrying mechanism around said central axis, the end of said arcuate track adjacent to the position of the holder where the holder is reengaged by said holder carrying mechanism being yieldable generally toward said central axis.

9. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis, an arcuate track at said loading position, an engagement element on each holder for slidably supporting the holder on said track, a driving device on said track for shifting the holder on the track past said loading position, and a control device actuated by the rotation of said holder carrying mechanism around said central axis to move said holder carrying mechanism for depositing said holder on said track and then for disengaging and reengaging said holder carrying mechanism from and with said holders respectively after the holder traveled past said loading position and for turning said holder carrying mechanism to align said holder with said peeling mechanism, successively during each revolution of said holder carrying mechanism around said central axis, and a device actuated in synchronism with the movement of said holder carrying mechanism to bend said yieldable track end gradually as said carrying mechanism reengages said holder and moves it off said track.

10. The combination with a peeling machine having a peeling mechanism carried around a central axis of the machine and means to actuate the peeling mechanism at predetermined positions during its movement around said axis; of holders to receive fruit to be peeled, a holder carrying mechanism carried around said axis with said peeling mechanism to move said holders to a loading position and then to move said holders into operative relation to the peeling mechanism during each revolution around said axis, an arcuate track at said loading position, an engagement element on each holder for slidably supporting the holder on said track, a driving device on said track for shifting the holder on the track past said loading position, and a control device actuated by the rotation of said holder carrying mechanism around said central axis to move said holder carrying mechanism for depositing said holder on said track and then for disengaging and reengaging said holder carrying mechanism from and with said holders respectively after the holder is deposited on the track and after the holder traveled past said loading position and for turning said holder carrying mechanism to align said holder with said peeling mechanism, successively during each revolution of said holder carrying mechanism around said central axis, arcuate sections forming the end of the track adjacent the point of reengagement of said holders by said carrying mechanism, a resiliently yieldable element holding said sections in continuous track forming position, a lever fulcrumed adjacent said track and engaging the outermost of said track sections, and a cam actuated mechanism operated by the rotation of said holder carrying mechanism to bend said sectional track end toward said axis in proportion to the movement of said holder carrying mechanism after said reengagement of said holder.

11. In a holder for fruit handling machines, a cup, a hollow bottom on said cup, a socket at said hollow bottom opening away from said cup, and a system of passages communicating the interior of said cup to said socket and adapted to communicate air flow to and from said cup, and a guide channel extended from the underside of said cup and adapted to support said cup on a track, and a gear segment along the outside of said channel.

12. In a holder for fruit handling machines, a cup, a hollow bottom on said cup, a socket at said hollow bottom opening away from said cup, and a system of passages communicating the interior of said cup to said socket and adapted to communicate air flow to and from said cup, and a guide channel extended from the underside of said cup and adapted to support said cup on a track, and a gear segment along the outside of said channel, and an arcuate drive groove under said gear segment.

13. In a fruit holder for a peeling machine, a pair of spaced connected cups, a hollow base under the bottom of each cup, and a socket between the cups opening oppositely to said cups and having apertures on its side communicating with said hollow bases, said bases also communicating with the interiors of the respective cups to permit the passage of air out of and into said cups through said socket apertures.

14. In a fruit holder for a peeling machine, a pair of spaced connected cups, a hollow base under the bottom of each cup, and a socket between the cups opening oppositely to said cups and having apertures on its side communicating with said hollow bases, said bases also communicating with the interiors of the respective cups to permit the passage of air out of and into said cups through said socket apertures, a channel guide extended to one side of said cups for supporting said cups on a track, and elements on the outside of said channel engageable with driving means for moving said pair of cups along a track.

15. In a peeling machine of the character described, a cup, a socket on the bottom of the cup, a cup carrying arm on said machine, a spindle on said arm fitting into said socket, and controlled means to draw the air out of said cup and readmit air into the cup through said socket, said spindle and said arm, a track, means on the cup to support and guide the cup on the track, and a mechanism to move said arm for depositing said cup on the track, then withdrawing the spindle from said socket at one end of said track and reengaging said spindle with the socket at the other end of the track.

16. In a peeling machine of the character described, a cup, a socket on the bottom of the cup, a cup carrying arm on said machine, a spindle on said arm fitting into said socket, and controlled means to draw the air out of said cup and readmit air into the cup through said socket, said spindle and said arm, a track, means on the cup to support and guide the cup on the track, and a mechanism to move said arm for depositing said cup on the track, then withdrawing the spindle from said socket at one end of said track and reengaging said spindle with the socket at the other end of the track, the last end of said track being resiliently yieldable to allow turning of said cup after it is reengaged and moved away by said spindle and arm.

17. In a peeling machine of the character described, a cup, a socket on the bottom of the cup, a cup carrying arm on said machine, a spindle on said arm fitting into said socket, and controlled means to draw the air out of said cup and readmit air into the cup through said socket, said spindle and said arm, a track, means on the cup to support and guide the cup on the track, and a mechanism to move said arm for depositing said cup on the track, then withdrawing the spindle from said socket at one end of said track and reengaging said spindle with the socket at the other end of the track, the last end of said track being resiliently yieldable to allow turning of said cup after it is reengaged and moved away by said spindle and arm, and means to move said cup on said track from one end to the other.

18. In a peeling machine of the character described, a cup, a socket on the bottom of the cup, a cup carrying arm on said machine, a spindle on said arm fitting into said socket, and controlled means to draw the air out of said cup and readmit air into the cup through said socket, said spindle and said arm, a track, means on the cup to support and guide the cup on the track, and a mechanism to move said arm for depositing said cup on the track, then withdrawing the spindle from said socket at one end of said track and reengaging said spindle with the socket at the other end of the track, the last end of said track being resiliently yieldable to allow turning of said cup after it is reengaged and moved away by said spindle and arm, and means to move said cup on said track from one end to the other at a slower rate of speed than the movement of said arm, so that said arm deposits one cup at one end of the track and reengages another cup at the other end of the track.

19. In a peeling machine of the character described, a cup, a socket on the bottom of the cup, a cup carrying arm on said machine, a spindle on said arm fitting into said socket, and controlled means to draw the air out of said cup and readmit air into the cup through said socket, said spindle and said arm, a track, means on the cup to support and guide the cup on the track, and a mechanism to move said arm for depositing said cup on the track, then withdrawing the spindle from said socket at one end of said track and reengaging said spindle with the socket at the other end of the track, the last end of said track being resiliently yieldable to allow turning of said cup after it is reengaged and moved away by said spindle and arm, and a feeding device to deposit fruit to be handled into said cup during its travel on the track.

20. In a peeling machine of the character described a frame, a peeling mechanism rotated on said frame, an arm rotated on said frame with said peeling mechanism, a cup, an element on said arm releasably engaging and carrying said cup, a loading device at one side of said frame, means to support said cup at said loading device, and a device actuated by the rotation of said arm around said frame for swinging said arm and said element to said track for depositing said cup on said supporting means and after loading for picking up said cup and bringing the loaded cup into alignment with said peeling mechanism once during each revolution of said peeling mechanism.

21. In a peeling machine of the character described a frame, a peeling mechanism rotated on said frame, an arm rotated on said frame with said peeling mechanism, a cup, an element on said arm releasably engaging and carrying said cup, a loading device at one side of said frame, means to support said cup at said loading device, and a device actuated by the rotation of said arm around said frame for swinging said arm and said element to said track for depositing said cup on said supporting means and after loading for picking up said cup and bringing the loaded cup into alignment with said peeling mechanism once during each revolution of said peeling mechanism, a suction device on said frame, a suction control synchronized with the rotation of said peeling mechanism and communicated with said cup through said arm and through said cup carrying element to connect said suction device to said cup when rengaged by said element and to break said connection and suction to said cup when the latter is aligned and engaged by the peeling mechanism.

22. In a peeling machine of the character described, a stationary frame, a rotating frame on the stationary frame, a plurality of peeling mechanisms carried on said rotating frame, an arm swiveably and slidably supported on said rotating frame adjacent each peeling mechanism, a plurality of cup elements, a spindle element on each arm releasably supporting a cup element, a loading track at one side of the frame, said cup elements being adapted to ride on said track to be loaded, a cam controlled device to turn each arm away from the adjacent peeling mechanism and to said track for depositing the cup at one end of said track and to pick up another cup at the other end of said track, cam controlled means for sliding said arm to withdraw said spindle element from said cup at said first end of the track and to insert said spindle element into another cup at said other end of said track, said cam controlled means turning said arm beyond said other end of the track to move the cup thereon into alignment with the adjacent peeling mechanism, and means on and peeling mechanism actuated by the rotation of said mechanism to remove the fruit from the aligned cup for peeling.

23. In a peeling machine of the character described, a stationary frame, a rotating frame on the stationary frame, a plurality of peeling mechanisms carried on said rotating frame, an arm swivelably and slidably supported on said rotating frame adjacent each peeling mechanism, a plurality of cup elements, a spindle element on each arm releasably supporting a cup element, a loading track at one side of the frame, said cup elements being adapted to ride on said track to be loaded, a cam controlled device to turn each arm away from the adjacent peeling mechanism and to said track for depositing the cup at one end of said track and to pick up another cup at the other end of said track, cam controlled means for sliding said arm to withdraw said spindle element from said cup at said end of the track and to insert said spindle element into another cup at said other end of said track, said cam controlled means turning said arm beyond said other end of the track to move the cup thereon into alignment with the adjacent peeling mechanism, and means on said peeling mechanism actuated by the rotation of said mechanism to remove the fruit from the aligned cup for peeling, and means to move said cup on said track at a slower speed than the movement of said arms past said track.

24. In a peeling machine of the character described, a stationary frame, a rotating frame on the stationary frame, a plurality of peeling mechanisms carried on said rotating frame, an arm swivelably and slidably supported on said rotating frame adjacent each peeling mechanism, a plurality of cup elements, a spindle element on each arm releasably supporting a cup element, a loading track at one side of the frame, said cup elements being adapted to ride on said track to be loaded, a cam controlled device to turn each arm away from the adjacent peeling mechanism and to said track for depositing the cup at one end of said track and to pick up another cup at the other end of said track, cam controlled means for sliding said arm to withdraw said spindle element from said cup at said first end of the track and to insert said spindle element into another cup at said other end of said track, said cam controlled means turning said arm beyond said other end of the track to move the cup thereon into alignment with the adjacent peeling mechanism, and means on said peeling mechanism actuated by the rotation of said mechanism to remove the fruit from the aligned cup for peeling, a suction device connected through said arm and said spindle element to the interior of said cup for holding the fruit in said cup, and means actuated in synchronism with said rotation to break said suction in the cup when the cup is aligned with a peeling mechanism.

25. In a peeling machine of the character described, a stationary frame, a rotating frame on the stationary frame, a plurality of peeling mechanisms carried on said rotating frame, an arm swivelably and slidably supported on said rotating frame adjacent each peeling mechanism, a plurality of cup elements, a spindle element on each arm releasably supporting a cup element, a loading track at one side of the frame, said cup elements being adapted to ride on said track to be loaded, a cam controlled device to turn each arm away from the adjacent peeling mechanism and to said track for depositing the cup at one end of said track and to pick up another cup at the other end of said track, cam controlled means for sliding said arm to withdraw said spindle element from said cup at said first end of the track and to insert said spindle element into another cup at said other end of said track, said cam controlled means turning said arm beyond said other end of the track to move the cup thereon into alignment with the adjacent peeling mechanism, and means on said peeling mechanism actuated by the rotation of said mechanism to remove the fruit from the aligned cup for peeling, and means to move said cup on said track at a slower speed than the movement of said arms past said track, and a device actuated by said cup moving mechanism on the track for feeding fruit in the cups on the track.

26. In a peeling machine of the character described, a stationary frame, a rotating frame on the stationary frame, a plurality of peeling mechanisms carried on said rotating frame, an arm swivelably and slidably supported on said rotating frame adjacent each peeling mechanism, a plurality of cup elements, a spindle element on each arm releasably supporting a cup element, a loading track at one side of the frame, said cup elements being adapted to ride on said track to be loaded, a cam controlled device to turn each arm away from the adjacent peeling mechanism and to said track for depositing the cup at one end of said track and to pick up another cup at the other end of said track, cam controlled means for sliding said arm to withdraw said spindle element from said cup at said first end of the track and to insert said spindle element into another cup at said other end of said track, said cam controlled means turning said arm beyond said other end of the track to move the cup thereon into alignment with the adjacent peeling mechanism, and means on said peeling mechanism actuated by the rotation of said mechanism to remove the fruit from the aligned cup for peeling, and a mechanism at said other end of said track to guide the initial turning of the cup from said track toward the adjacent peeling mechanism.

27. In a peeling machine of the character described, a stationary frame, a rotating frame on the stationary frame, a plurality of peeling mechanisms carried on said rotating frame, an arm swivelably and slidably supported on said rotating frame adjacent each peeling mechanism, a plurality of cup elements, a spindle element on each arm releasably supporting a cup element, a loading track at one side of the frame, said cup elements being adapted to ride on said track to be loaded, a cam controlled device to turn each arm away from the adjacent peeling mechanism and to said track for depositing the cup at one end of said track and to pick up another cup at the other end of said track, cam controlled means for sliding said arm to withdraw said spindle element from said cup at said first end of the track and to insert said spindle element into another cup at said other end of said track, said cam controlled means turning said arm beyond said other end of the track to move the cup thereon into alignment with the adjacent peeling mechanism, and means on said peeling mechanism actuated by the rotation of said mechanism to remove the fruit from the aligned cup for peeling, a coring device adjacent each peeling mechanism and a control mechanism coacting with the peeling mechanism to raise said coring device into the fruit during the peeling of the fruit by said peeling mechanism, and then to lower said coring device with the peeled fruit thereon.

28. In a peeling machine of the character described, a stationary frame, a rotating frame on the stationary frame, a plurality of peeling mechanisms carried on said rotating frame, an arm swivelably and slidably supported on said rotating frame adjacent each peeling mechanism, a plurality of cup elements, a spindle element on each arm releasably supporting a cup element, a loading track at one side of the frame, said cup elements being adapted to ride on said track to be loaded, a cam controlled device to turn each arm away from the adjacent peeling mechanism and to said track for depositing the cup at one end of said track and to pick up another cup at the other end of said track, cam controlled means for sliding said arm to withdraw said spindle element from said cup at said first end of the track and to insert said spindle element into another cup at said other end of said track, said cam controlled means turning said arm beyond said other end of the track to move the cup thereon into alignment with the adjacent peeling mechanism, and means on said peeling mechanism actuated by the rotation of said mechanism to remove the fruit from the aligned cup for peeling, a coring device adjacent each peeling mechanism, and a control mechanism coacting with the peeling mechanism to raise said coring device into the fruit during the peeling of the fruit by said peeling mechanism, and then to lower said coring device with the peeled fruit thereon, and stripping means adjacent said frames to strip said fruit from said coring device when the latter is lowered.

29. In a peeling machine of the character described, a stationary frame, a rotating frame on said stationary frame, a plurality of peeling mechanisms on the rotating frame, a loading track on one side of said frames, a plurality of fruit carrying cups moving from one end of said loading track to the other end thereof, an arm support adjacent each peeling mechanism, an arm extended outwardly generally radially from each support, each arm being adjustable axially on its support and turning with said support, a generally vertical spindle on each arm, each cup having a socket therein engageable by said spindle, to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling.

30. In a peeling machine of the character described, a stationary frame, a rotating frame on said stationary frame, a plurality of peeling mechanisms on the rotating frame, a loading track on one side of said frames, a plurality of fruit carrying cups moving from one end of said loading track to the other end thereof, an arm support adjacent each peeling mechanism, an arm extended outwardly generally radially from each support, each arm being adjustable axially on its support and turning with said support, a generally vertical spindle on each arm, each cup having a socket therein engageable by said spindle, to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling, said track being arcuate and generally concentric with the axis of rotation of said rotating frame, and means on said track to move the cups along the track for loading at a slower rate of speed than the speed of movement of said arms along said track.

31. In a peeling machine of the character described, a stationary frame, a rotating frame on said stationary frame, a plurality of peeling mechanisms on the rotating frame, a loading track on one side of said frames, a pluraltiy of fruit carrying cups moving from one end of said loading track to the other end thereof, an arm support adjacent each peeling mechanism, an arm extended outwardly generally radially from each support, each arm being adjustable axially on its support and turning with said support, a generally vertical spindle on each arm, each cup having a socket therein engageable by said spindle, to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling, said track being arcuate and generally concentric with the axis of rotation of said rotating frame, and means on said track to move the cups along the track for loading at a slower rate of speed than the speed of movement of said arms along said track, and means at said other end of said track to guide the initial turning of the cup with said spindle and arm during the movement of the cup off said track.

32. In a peeling machine of the character described, a stationary frame, a rotating frame on said stationary frame, a plurality of peeling mechanisms on the rotating frame, a loading track on one side of said frames, a plurality of fruit carrying cups moving from one end of said loading track to the other end thereof, an arm support adjacent each peeling mechanism, an arm extended outwardly generally radially from each support, each arm being adjustable axially on its support and turning with said support, a generally vertical spindle on each arm, each cup having a socket therein engageable by said spindle, to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling, said moving means on said track comprising a gear adjacent the track, a gear segment on each cup engaged by said gear to push each cup past said gear on the track, and conveyor means to move the cups from said first end of the track to said gear.

33. In a peeling machine of the character described, a stationary frame, a rotating frame on said stationary frame, a plurality of peeling mechanisms on the rotating frame, a loading track on one side of said frames, a plurality of fruit carrying cups moving from one end of said loading track to the other end thereof, an arm support adjacent each peeling mechanism, an arm extended outwardly generally radially from each support, each arm being adjustable axially on its support and turning with said support, a generally vertical spindle on each arm, each cup having a socket therein engageable by said spindle, to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling, a suction base on each cup, said spindle having passages therein communicating with the suction base in the cup thereon, a suction conduit formed from each spindle through each arm and arm support, a suction chamber on the rotating frame for each suction conduit, a suction device on the stationary frame, and a control element to connect said suction device to said suction chambers in series when each of the respective spindles is aligned with the adjacent peeling mechanism.

34. In a peeling machine of the character described, a stationary frame, a rotating frame on said stationary frame, a plurality of peeling mechanism on the rotating frame, a loading track on one side of said frames, a plurality of fruit carrying cups moving from one end of said loading track to the other end thereof, an arm support adjacent each peeling mechanism, an arm extended outwardly generally radially from each support, each arm being adjustable axially on its support and turning with said support, a generally vertcial spindle on each arm, each cup having a socket therein engageable by said spindle, to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling, each peeling mechanism including, pick up forks, a cam mechanism for lowering said pick up forks into the fruit in said cups and raising said forks with said fruit thereon, peeling blades, and resiliently yieldable support for said blades to hold the blades against the fruit for peeling said fruit.

35. In a peeling machine of the character described, a stationary frame, a rotating frame on said stationary frame, a plurality of peeling mechanisms on the rotating frame, a loading track on one side of said frames, a plurality of fruit carrying cups moving from one end of said loading track to the other end thereof, an arm support adjacent each peeling mechanism, an arm extended outwardly generally radially from each support, each arm being adjustable axially on its support and turning with said support, a generally vertical spindle on each arm, each cup having a socket therein engageable by said spindle to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling, each peeling mechanism including, pick up forks, a cam mechanism for lowering said pickup forks into the fruit in said cups and raising said forks with said fruit thereon, peeling blades, and resiliently yieldable support for said blades to hold the blades against the fruit for peeling said fruit, and coacting means on the stationary frame and on said spindle to spin said forks when moving in raised position.

36. In a peeling machine of the character described, a stationary frame, a rotating frame on said stationary frame, a plurality of peeling mechanisms on the rotating frame, a loading track on one side of said frames, a plurality of fruit carrying cups moving from one end of said loading track to the other end thereof, an arm support adjacent each peeling mechanism, an arm extended outwardly generally radially from each support, each arm being adjustable axially on its support and turning with said support, a generally vertical spindle on each arm, each cup having a socket therein engageable by said spindle to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling, each peeling mechanism including, pickup forks, a cam mechanism for lowering said pickup forks into the fruit in said cups and raising said forks with said fruit thereon, peeling blades, and resiliently yieldable support for said blades to hold the blades against the fruit for peeling said fruit, and coacting means on the stationary frame and on said spindle to spin said forks when moving in raised position, coring elements on the rotating frame opposite the respective forks, coacting cam device on said frame and on said supports to raise said coring elements into said fruits at about the uppermost position of said forks for coring said fruit around said forks and to impale the cored fruit on said coring elements.

37. In a peeling machine of the character described, a stationary frame, a rotating frame on said stationary frame, a plurality of peeling mechanisms on the rotating frame, a loading track on one side of said frames, a plurality of fruit carrying cups moving from one end of said loading track to the other end thereof, an arm support adjacent each peeling mechanism, an arm extended outwardly generally radially from each support, each arm being adjustable axially on its support and turning with said support, a generally vertical spindle on each arm, each cup having a socket therein engageable by said spindle to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling, each peeling mechanism including, pickup forks, a cam mechanism for lowering said pickup forks into the fruit in said cups and raising said forks with said fruit thereon, peeling blades, and resiliently yieldable support for said blades to hold the blades against the fruit for peeling said fruit, and coacting means on the stationary frame and on said spindle to spin said forks when moving in raised position, coring elements on the rotating frame opposite the respective forks, coring element supports, a coacting cam device to raise said coring elements into said fruits at about the uppermost position of said forks for coring said fruits around said forks and to impale the cored fruits on said coring elements, said cam device lowering said coring elements after each coring, and a stripper adjacent each coring element to push the fruit off the coring element as the latter is lowered.

38. In a peeling machine of the character described, a stationary frame, a rotating frame on said stationary frame, a plurality of peeling mechanisms on the rotating frame, a loading track on one side of said frames, a plurality of fruit carrying cups moving from one end of said loading track to the other end thereof, an arm support adjacent each peeling mechanism, an arm extended outwardly generally radially from each support, each arm being adjustable axially on its support and turning with said support, a generally vertical spindle on each arm, each cup having a socket therein engageable by said spindle to be carried thereby, a cam on said stationary frame, a rotating device on the rotary frame turned by said cam, connecting means between the rotating device and the adjacent arm support to turn the arm support and the arm toward said track and then into alignment with the adjacent peeling mechanism once during each revolution of said rotating frame, a second cam on said stationary frame, a lifting device extended from each arm to the second cam and actuated by said second cam to lower said arm and spindle at one end of said track and to raise said arm and spindle into a cup at the other end of said track, and means at each peeling mechanism to lift the fruit out of the aligned cups for peeling, said track being arcuate and generally concentric with the axis of rotation of said rotating frame, and means on said track to move the cups along the track for loading at a slower rate of speed than the speed of movement of said arms along said track, a suction base on each cup, said spindle having passages therein communicating with the suction base in the cup thereon, a suction conduit formed from each spindle through each arm and arm support, a suction chamber on the rotating frame for each suction conduit, a suction device on the stationary frame, and a control element to connect said suction device to said suction chambers in series when each of the respective spindles is aligned with the adjacent peeling mechanism, each peeling mechanism including, pickup forks, a cam mechanism for lowering said pickup forks into the fruit in said cups and raising said forks with said fruit thereon, peeling blades, and resiliently yieldable support for said blades to hold the blades against the fruit for peeling said fruit, and a drive mechanism on the stationary frame to operate said mechanism in synchronism on a predetermined cycle.

BENSON W. RUTHERFORD.

REFERENCES CITED

The following references are of record in the file of this patent:

UNITED STATES PATENTS

| Number | Name | Date |
| --- | --- | --- |
| 688,909 | Warner | Dec. 17, 1901 |
| 984,843 | Pease | Feb. 21, 1911 |
| 1,445,147 | Kohler | Feb. 13, 1923 |
| 1,451,571 | Gay | Apr. 10, 1923 |
| 1,490,493 | Tenney | Apr. 15, 1924 |
| 1,583,100 | Reynolds | May 4, 1926 |
| 1,711,051 | Gates | Apr. 30, 1929 |
| 1,888,851 | Donovan et al. | Nov. 22, 1932 |
| 2,081,441 | Willshaw et al. | May 25, 1937 |
| 2,177,967 | Watkins | Oct. 31, 1939 |
| 2,187,075 | Coons | Jan. 16, 1940 |
| 2,345,843 | Watkins | Apr. 4, 1944 |
| 2,418,805 | Lindner | Apr. 8, 1947 |
| 2,443,188 | Hodson | June 15, 1948 |
| 2,459,368 | Dunn | Jan. 18, 1949 |